(12) United States Patent
Kaen

(10) Patent No.: US 12,407,505 B1
(45) Date of Patent: Sep. 2, 2025

(54) ENCRYPTION KEY GENERATING SATELLITE

(71) Applicant: Hooshang Kaen, Los Angeles, CA (US)

(72) Inventor: Hooshang Kaen, Los Angeles, CA (US)

( * ) Notice: Subject to any disclaimer, the term of this patent is extended or adjusted under 35 U.S.C. 154(b) by 0 days.

(21) Appl. No.: 18/931,042

(22) Filed: Oct. 30, 2024

Related U.S. Application Data

(60) Provisional application No. 63/594,416, filed on Oct. 30, 2023.

(51) Int. Cl.
*H04B 7/185* (2006.01)
*H04B 7/19* (2006.01)
*H04L 9/08* (2006.01)

(52) U.S. Cl.
CPC .................................. *H04L 9/088* (2013.01)

(58) Field of Classification Search
CPC ...................................................... H04L 9/088
See application file for complete search history.

(56) References Cited

U.S. PATENT DOCUMENTS

| | | | |
|---|---|---|---|
| 5,577,122 | A | 11/1996 | Schipper et al. |
| 5,659,615 | A | 8/1997 | Dillon |
| 6,145,011 | A | 11/2000 | Furukawa et al. |
| 6,373,946 | B1 | 4/2002 | Johnston |
| 8,671,273 | B2 | 3/2014 | Roy-Chowdhury et al. |
| 9,602,580 | B2 | 3/2017 | Sobhani et al. |
| 10,958,335 | B2 | 3/2021 | Kaen |
| 11,040,786 | B2 | 6/2021 | Kaen |

(Continued)

FOREIGN PATENT DOCUMENTS

| | | |
|---|---|---|
| EP | 0179612 A2 | 4/1986 |
| WO | WO 01/48948 A1 | 7/2001 |

OTHER PUBLICATIONS

Author unknown, "Space Missions Key Management Concept," The Consultative Committee for Space Data systems (CCSDS), Report Concerning Space Data System Standards, Informational Report CCSDS 350.6-G-1, Green Book, Nov. 2021, 56 pages.

*Primary Examiner* — Phy Anh T Vu
(74) *Attorney, Agent, or Firm* — Makoui Law, PC; Ali Makoui

(57) ABSTRACT

A method of communication between first and second communication devices includes receiving a connection request at a first communication satellite from a first communication device to connect to a second communication device; sending the connection request from the first communication satellite to a key generating satellite; generating first and second encryption keys by the key generating satellite using only hardware and software onboard the key generating satellite; sending the first key from the key generating satellite through the first communication satellite to the first communication device; sending the second encryption key from the key generating satellite through a second communication satellite to the second communication device; and exchanging the signals encrypted by the first and second encryption keys between the first and second communication devices through the first and second communication satellites, where the communication between the first and second communication devices does not route through any terrestrial networks.

21 Claims, 34 Drawing Sheets

(56) References Cited

U.S. PATENT DOCUMENTS

| | | |
|---|---|---|
| 11,533,170 B2 | 12/2022 | Elbaz et al. |
| 12,143,488 B2 | 11/2024 | Moore |
| 12,294,443 B2 | 5/2025 | Ravishankar et al. |
| 2005/0066355 A1 | 3/2005 | Cromer et al. |
| 2006/0270451 A1 | 11/2006 | Best et al. |
| 2009/0287922 A1* | 11/2009 | Herwono ................ H04L 9/321 380/279 |
| 2011/0013774 A1 | 1/2011 | Popa et al. |
| 2012/0257748 A1 | 10/2012 | Popa et al. |
| 2016/0154106 A1 | 6/2016 | Fernandez-Hernandez |
| 2017/0285171 A1 | 10/2017 | Ries |
| 2019/0074893 A1* | 3/2019 | Kaen ....................... H04B 7/19 |
| 2020/0213111 A1* | 7/2020 | Leavy ................... H04L 9/3242 |
| 2021/0029546 A1* | 1/2021 | Maufort ................ G06F 21/608 |
| 2022/0094431 A1 | 3/2022 | Kaen et al. |
| 2022/0191011 A1 | 6/2022 | Kane |
| 2022/0260725 A1* | 8/2022 | Schiller ................... G01J 3/021 |
| 2023/0231699 A1* | 7/2023 | Richarte ............. H04L 63/0428 713/170 |
| 2024/0178994 A1* | 5/2024 | Bedington ........... H04L 9/0869 |

\* cited by examiner

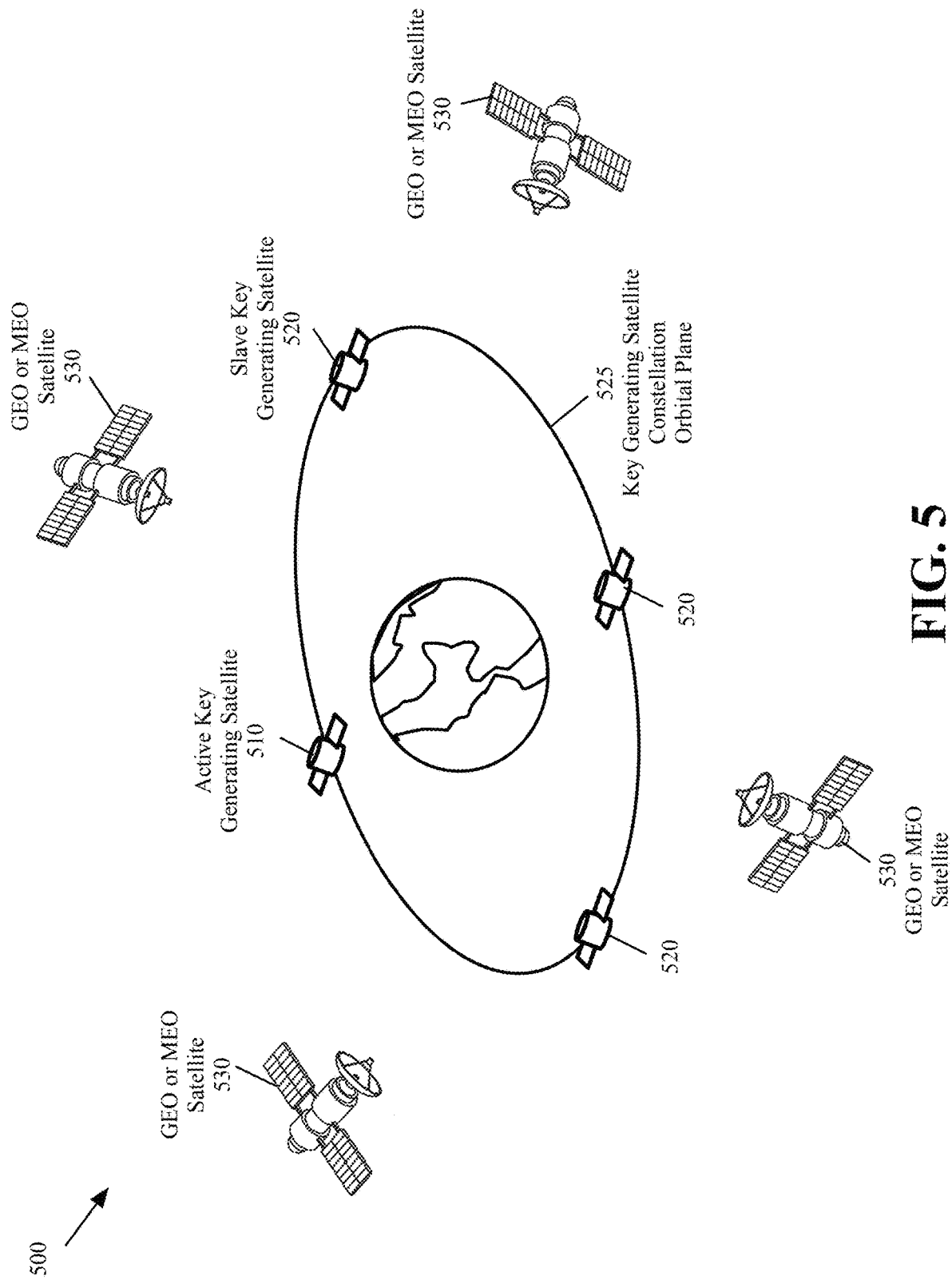

ENCRYPTION KEY GENERATING SATELLITE

CLAIM OF BENEFIT TO PRIOR APPLICATIONS

This application claims the benefit of U.S. Provisional Patent Application Ser. No. 63/594,416, filed on Oct. 30, 2023. The contents of U.S. Provisional Patent Application 63/594,416 are hereby incorporated by reference.

BACKGROUND

A communication satellite creates a communication channel between a source transmitter and a receiver by relaying and amplifying radio signals using transponders. The major vulnerability of any communication system is the ground infrastructure and in particular the Internet network. Hacking, tapping, and eavesdropping via the ground based systems are the most popular means of stealing or corrupting valuable data.

Data encryption is used to protect the security and confidentiality of communication signals from hacking, tapping, and eavesdropping. The most currently used secure means for data security is using ground-based hardware encryptor/decryptor units that provide secure uplink and downlink protection for satellite communications links. These ground-based units, however, are vulnerable to the same cyberattack vulnerabilities as any other ground based equipment.

BRIEF DESCRIPTION OF THE DRAWINGS

The various embodiments of the present encryption key generating satellite now will be discussed in detail with an emphasis on highlighting the advantageous features. These embodiments depict the novel and non-obvious key encryption key generating satellite shown in the accompanying drawings, which are for illustrative purposes only. These drawings include the following figures, in which like numerals indicate like parts:

FIG. 5 is a functional diagram illustrating a communication system that includes a constellation of encryption key generating satellites and a constellation GEO or MEO communication satellites, according to various aspects of the present disclosure;

DETAILED DESCRIPTION

Figure 1:
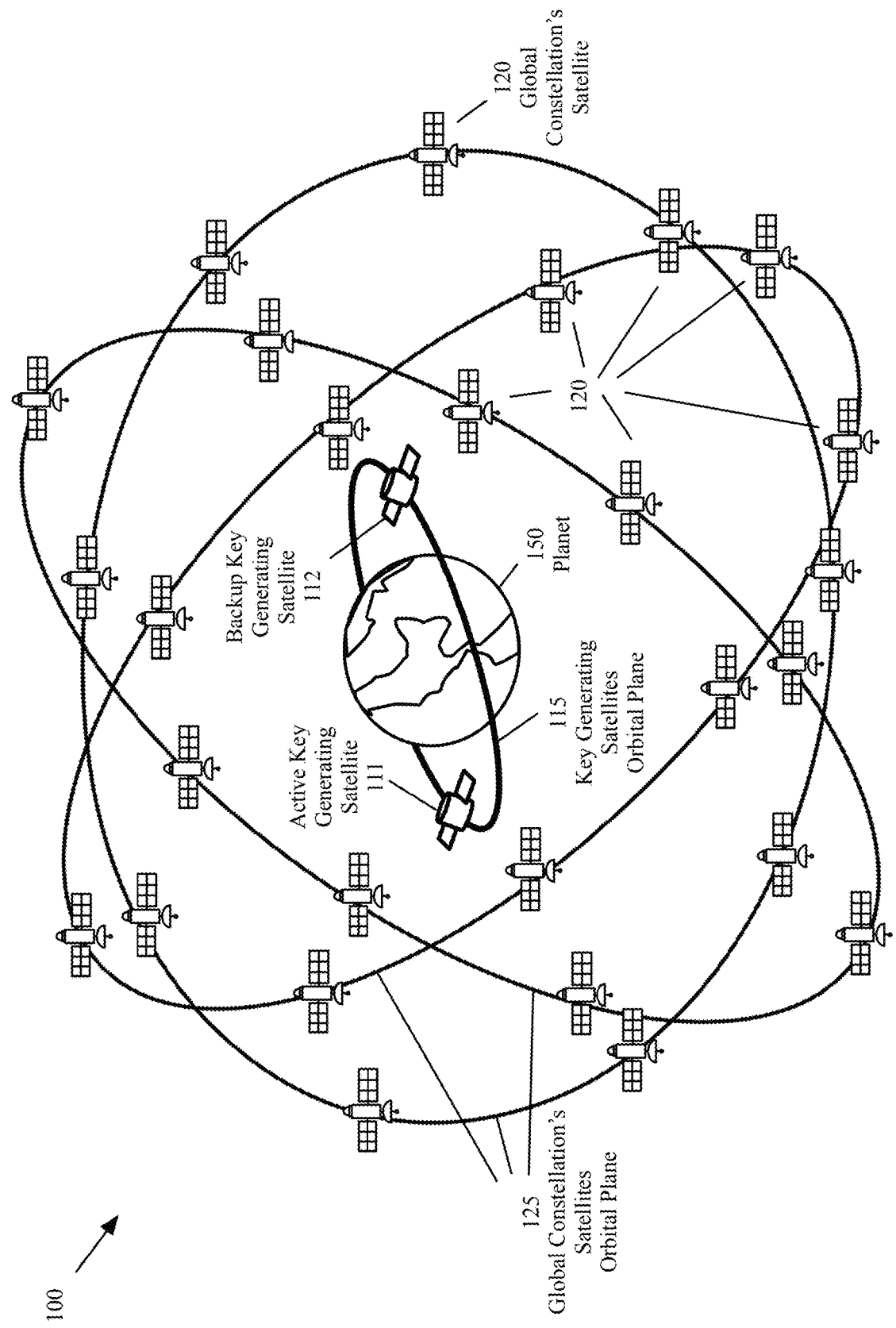
FIG. 1 is a functional diagram illustrating a communication system that includes a constellation of communicating satellites and at least one encryption key generating satellite, according to various aspects of the present disclosure.

One aspect of the present embodiments includes the realization that integrating satellite and terrestrial networks makes the system more vulnerable to cyberattacks. The major vulnerability of satellite communication systems is the susceptibility of the ground infrastructure and in particular the Internet to cyberattacks. Signal jamming, spoofing, data interception, and cyberattacks on ground stations are among major vulnerabilities of satellite communication systems.

One such example is the use of a ciphering server associated with the ground-based serving support node (SGSN) of General Packet Radio Service (GPRS) where the ciphering server operates as a trusted party providing the necessary ciphering information, such as the encryption keys and/or the encryption, to the GPRS terminals.

Another such example is the satellite-mediated quantum key distribution (QKD) systems that use quantum properties of light photons to encrypt secret keys that may be shared by two communicating parties to protect their communications. In these systems, the encryption keys that are generated on the ground-based facilities are transmitted to the two communicating parties using key distribution satellites.

In all existing satellite communication systems, the encryption keys that are required to secure the link are generated by ground-based hardware and software units. However, the generation of the encryption keys by the ground-based facilities would make the satellite communication systems vulnerable to the same cyberattacks and spoofing that are suffered by other ground-based telecommunication systems.

The present embodiments, as described in detail below, solve the above-mentioned problems by providing a satellite communication system that provides communication between two communication devices only through direct satellite links. The communication between two communication devices does not go through any ground infrastructure. The present embodiments provide a key generating satellite that generates encryption keys using hardware and software located on-board the key generating satellite. Some embodiments may provide one or more backup key generating satellites. In some embodiments, at least one backup key generating satellite may function as a hot standby and may take over the function of an active key generating satellite if the active key generating satellite suffers a failure or is taken offline. In some embodiments, the key generating satellites may function as relay satellites to pass communication date between the two communication devices.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a functional diagram illustrating a communication system 100 that includes a constellation of communicating satellites and at least one encryption key generating satellite, according to various aspects of the present disclosure. With reference to FIG. 1, the communication system 100 may include one or more key generating satellites 111-112 and one or more communication satellites 120 that may belong to a global or regional constellation of communication satellites.

At least one key generating satellite, for example, the key generating satellite 111, may be active at each time and may generate encryption keys, as described below. In some embodiments, other key generating satellite(s), for example, the key generating satellite 112 may function as backup key generating satellite. In some embodiments, at least one backup key generating satellite may function as a hot standby and may take over the function of the active key generating satellite if the active key generating satellite suffers a failure or is taken offline.

The key generating satellites 111-112 may share a common orbital plane 115 around the planet 150. The key generating satellites 111-112 may not communicate with ground stations and may only rely on on-board hardware and software key generation components. The key generating satellites 111-112 may communicate with each other and/or with other satellites 125 using free space optical (FSO) or radio frequency (RF) beams. The FSO may be implemented using infrared laser light. Communication using laser is also referred to as laser communication (lasercom).

A satellite constellation may be a group of satellites working together as a system and may provide global, near global, or regional coverage. The constellation's satellites 120 may be placed in several complimentary orbital planes 125. The constellation's satellites 120 may communicate with ground stations and/or with each other.

The constellation's satellites 120 may be low Earth orbit (LEO) or medium Earth orbit (MEO) satellites. The LEO satellites may orbit around the Earth at an altitude of less than 2,000 kilometers (km), or 1,200 miles (mi), above sea level. The LEO satellites may have a period of 128 minutes or less. The MEO satellites may orbit around the Earth at an altitude of more than 2,000 km and less than 35,786 km (1,243 mi and 22,236 mi) above sea level. Examples of the existing LEO satellites constellations include Iridium (altitude of approximately 780 km), Globalstar (altitude of approximately 1,413 km), Orbcomm (altitude of approximately 775 km), and Starlink (altitude of approximately 550 km). An example of the existing MEO satellites constellations is O3b (altitude of approximately 8,062 km). The key generating satellites 111-112, in some embodiments, may be positioned at a lower altitude than the communication satellites 120. For example, in some embodiments, where the communication satellites are LEO satellites, the key generating satellites 111-112 may be placed at an altitude of less than 500 km. In other embodiments, where the communication satellites are MEO or GEO satellites, the key generating satellites may be placed at higher altitudes.

Figure 2:
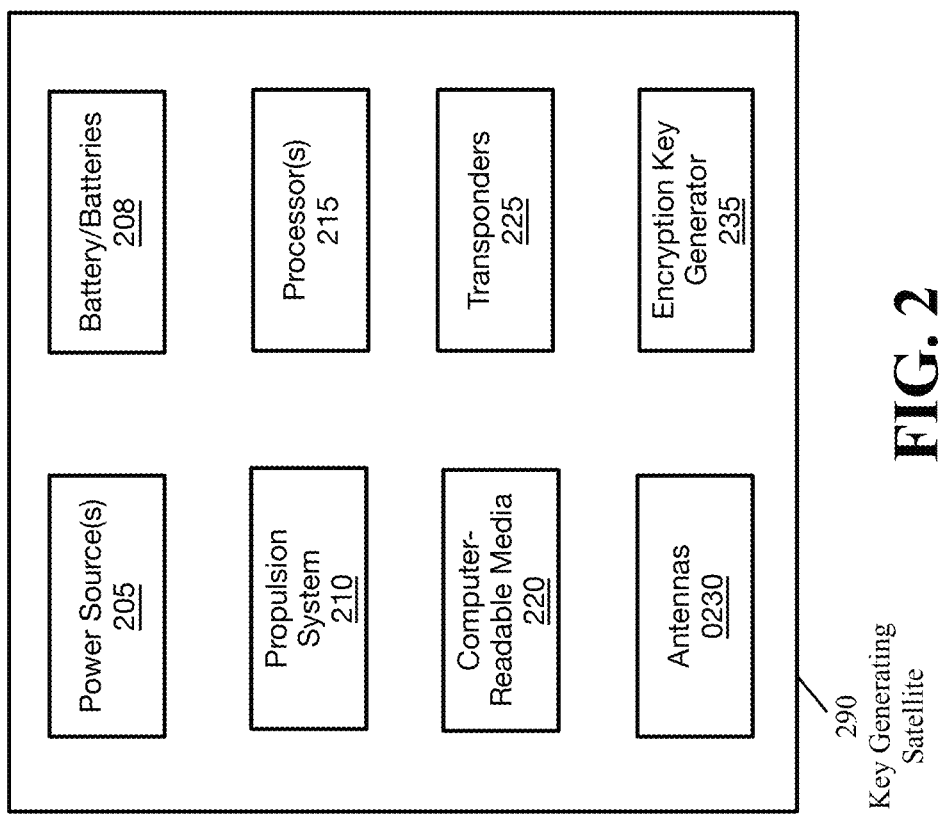
FIG. 2 is a functional block diagram illustrating different components of a key generating satellite, according to various aspects of the present disclosure.

FIG. 2 is a functional block diagram illustrating several components of a key generating satellite, according to various aspects of the present disclosure. The key generating satellite 290 may be any of the key generating satellites 111-112, 510-520, 830, and 1111-1112 of FIGS. 1, 4, 8, and 11, respectively. With reference to FIG. 2, the key generating satellite 290 may include one or more power sources 205, one or more batteries 208, a propulsion system 210, one or more processors 215, one or more computer-readable media 220, one or more transponders 225, one or more antennas 230, and an encryption key generator 235.

The power sources 205 may include one or more of a solar panel, a thermal harvester, an atomic fusion system, an atomic fission system, a chemical decay system, or a free electron gathering system. The power sources may include one or more batteries 208 to provide back-up power. The propulsion system 210 may allow the key generating satellite 290 to remain in a desired orbit and may be used to fine-tune the position and the orientation of the key generating satellite 290.

The processor(s) 215 may be space qualified processor(s) that may withstand the harsh conditions of space, including radiation, temperature, and other environmental factors. The processor(s) 215 may be connected to the computer-readable media 220 and may control the operation of the key generating satellite 290. The computer readable media 220 may be non-transitory computer readable media. The computer readable media 220 may include different types of memory units, such as, read-only-memory, volatile read-and-write memory, and/or non-volatile read-and-write memory.

The computer readable media 220 may include solid state storage, hard disks, laser disks, etc. The read-only-memory may store static data and instructions that are needed by the processor(s) 215. The non-volatile read-and-write memory may store instructions and data even when the power to the non-volatile memory is off. Some embodiments may use a mass-storage device (such as a magnetic or optical disk and its corresponding disk drive) as the non-volatile read-and-write memory.

The volatile read-and-write memory device may be random access memory and may be used as system memory. The system memory may store some of the instructions and data that the processor needs at runtime. In some embodiments, the processes of the present embodiments may be stored in the system memory, the non-volatile memory, and/or the read-only memory. From these various memory units, the processor(s) 215 may retrieve instructions to execute and data to process in order to execute the processes of some embodiments.

The transponders 225 may convert and/or amplify the received and transmitted signal frequencies. One or more of the transponders 225 may be configured to communication with transponders of the communication satellites (e.g., satellites 120 of FIGS. 1 and 11, satellites 530 of FIG. 5, and satellites 830 of FIG. 8). One or more of the transponders 225 may be configured to communication with the transponders of other key generating satellites. The key generating stellate 290 may not include a transponder that is configured to communicate with ground based infrastructure.

The antennas 230 may be used by the transponder(s) 225 to send and transmit signals to other satellites. All antennas 230 may be directed to communicate either with the communication satellites or with the other key generating satellites. None of the antennas 230 may be directed to the ground infrastructure. The key generating satellite 290 may have no direct communication with the ground infrastructure.

The encryption key generator 235 may include on-board hardware and/or software to generate encryption keys. For example, and without limitations, the encryption key generator 235, in some embodiments, may use hardware security modules (HSMs) to generate and protect cryptographic keys, to ensure high security levels. In some embodiments, the encryption key generator 235 may generate a pair of symmetric public and private encryption keys. Keys like RSA or ECDSA may be generated for secure digital signatures and public-key encryption. In some embodiments, the encryption key generator 235 may generate a truly random key using a hardware random number generator or a software-based pseudo-random number generator. For example, the encryption key generator 235 may generate a 256-bit AES encryption key.

The encryption key generator 235, in some embodiments, may include specialized hardware, like an encryption chip, that manages cryptographic keys and processes encryption functions without involving the processor(s) 215. In some embodiments, encryption keys may be stored securely within the encryption key generator 235. Only the hardware may have access to these keys, adding an extra layer of security.

In addition to generating encryption keys, the key generating satellite 290, in some embodiments, may be configured to validate users (e.g., the communication devices 311-312 described below). The computer-readable media 220 of the key generating satellite 290, in some embodiments, may include several peta bytes (10 to the power of 15 bytes) of space qualified storage. The computer-readable media 220 may store a list of authorized devices and/or authorized users that may communicate with any of the communication devices 311-312.

For example, if a communication device belongs to a business, the computer-readable media 220 of the key generating satellite 290 may store the customer list of the business, along with their account specific information in order to validate communication devices that may request to establish connection. The computer-readable media 220 of the key generating satellite 290 may store a list of authorized third parties (e.g., service providers, business associates, friends, etc.) in order to validate communication devices that may request to establish connection.

In some embodiments, the communication devices 311-312 and the key generating satellites may be equipped with encryption capability (e.g., with hardware encryption units that are compatible with each other and with the hardware encryption unit of the key generating satellite). The communication devices 311-312 may encrypt and decrypt the connection request using their hardware encryption units to provide additional security. Since the connection request is generated prior to generating encryption keys by the key generating satellite (e.g., as described in FIG. 3B or FIG. D), encrypting and decrypting the connection request using the hardware encryption unit provides the technical advantage of further securing the end to end communication between the communication devices 311-312. It should be noted that a portion of the connection request, for example, a header that may identify the communication devices 311-312 and the key generating satellite may not be encrypted to allow the communication device 120 that receives the connection request to route the request to proper destination.

The key generating satellite, in some embodiments, may validate a communication devise that is requesting to be connected to another communication device based on one or more criteria (e.g., whether the communication devices are authorized to communicate with each other, whether a username or password is provided, whether the call initiator's phone number is in the list of trusted callers of the call receiver, whether the connection request includes biometric data of a calling person, whether, whether the communication devices include the proper encryption capabilities, etc.).

The Key generating satellite 290, in some embodiments, may perform additional customer related applications. For example, the key generating satellite 290, in some embodiments, may store user related information in the computer-readable media 220. The Key generating satellite 290, in these embodiments, may include user specific applications, such as, for example, and without limitations, banking applications (e.g., fund transfers, currency exchange, etc.), providing secure connections between a headquarter (e.g., a bank, a government agency or ministry, a corporation headquarter, etc.) and their affiliates (e.g., branches, offices, embassies, consulates, etc.) around the world. These applications vary and the key generating satellites of the present embodiments provide the vehicles and the system for secure communication between multiplicity of users.

Figure 3A:
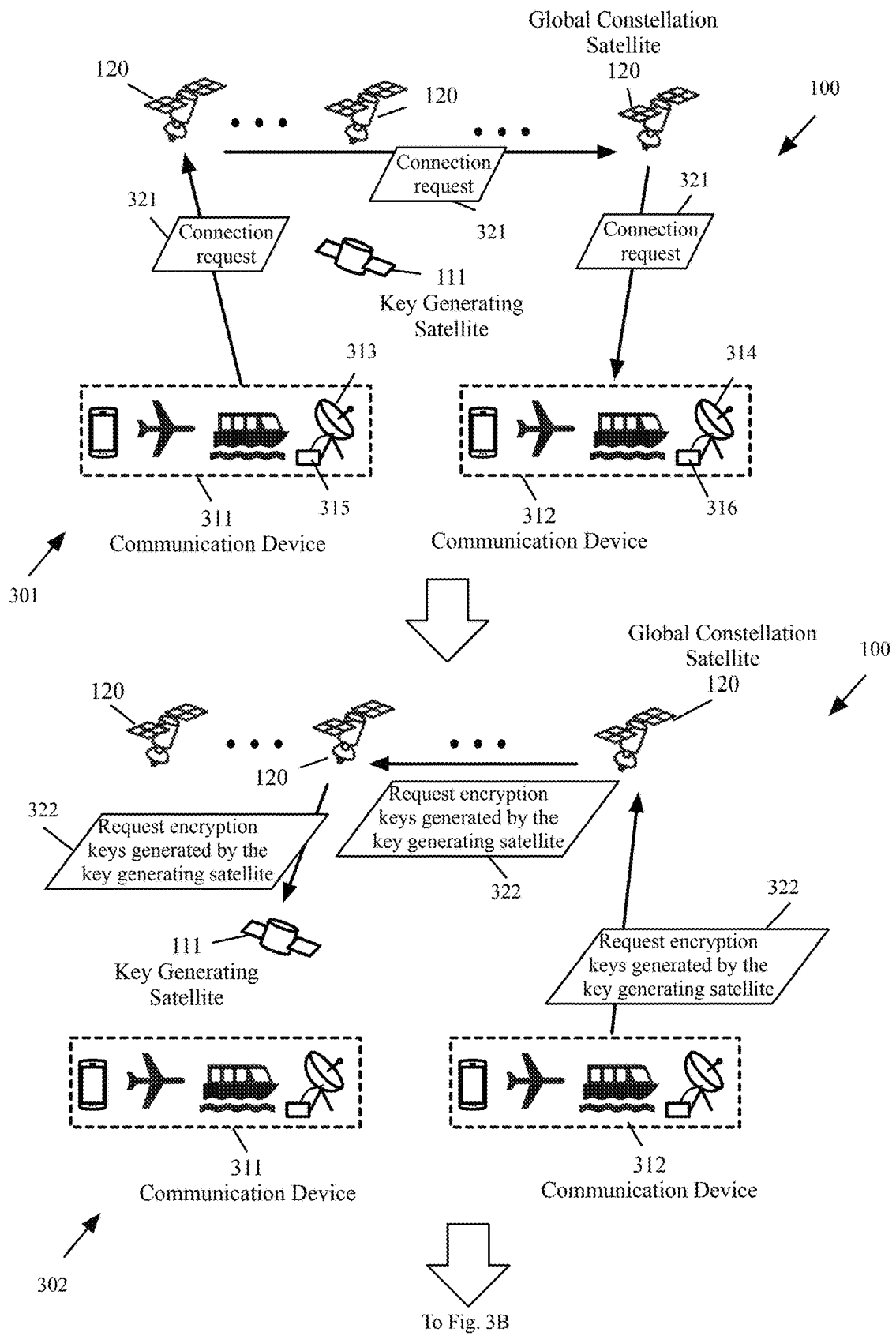
FIGS. 3A-3B are function diagrams illustrating a sequence of actions performed by the key generating satellite of FIG. 1 to generate encryption keys for a communication session between two communication devices, according to various aspects of the present disclosure.
Figure 3B:
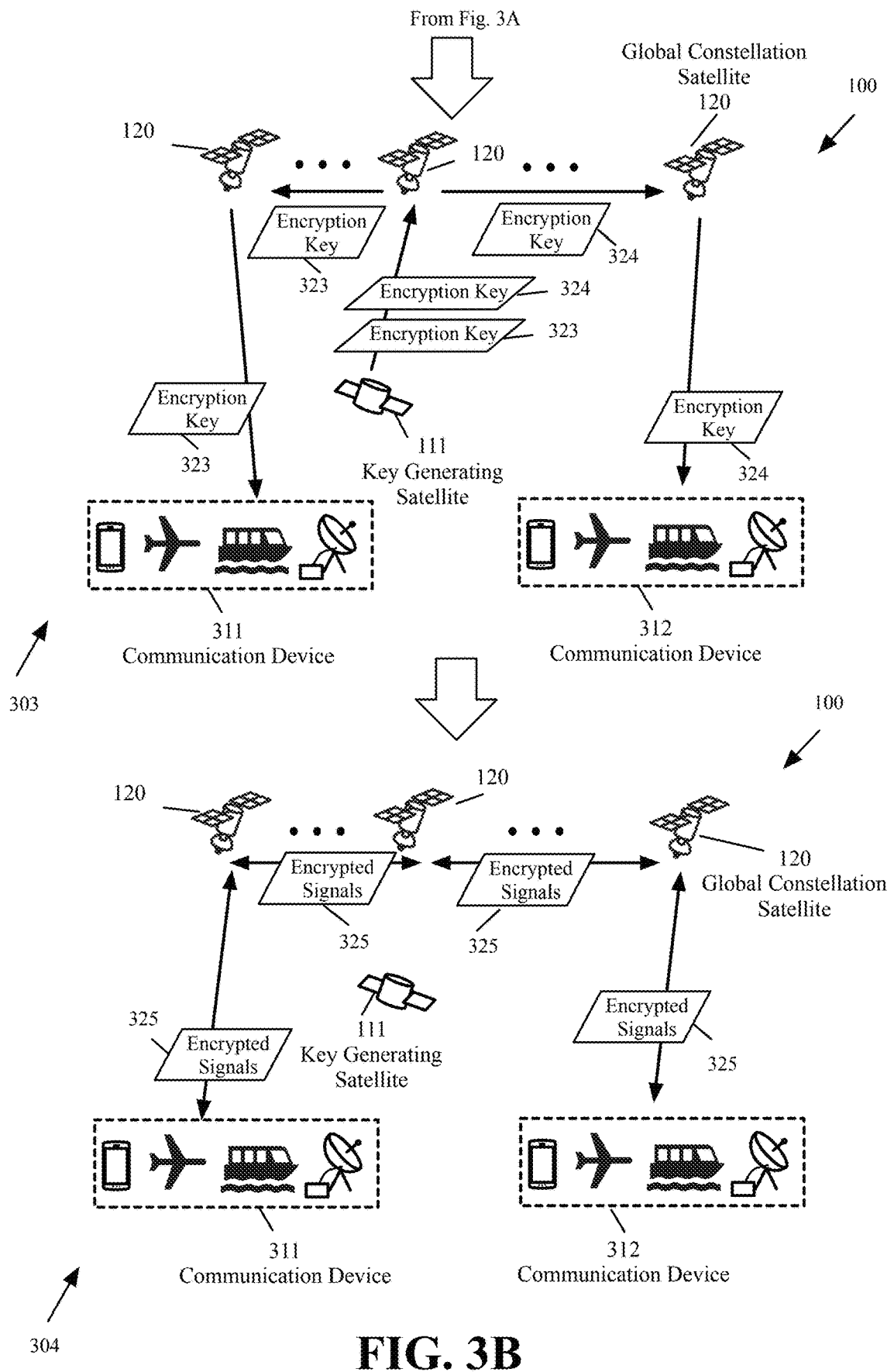

FIGS. 3A-3B are function diagrams illustrating a sequence of actions performed by the key generating satellite of FIG. 1 to generate encryption keys for a communication session between two communication devices, according to various aspects of the present disclosure. FIGS. 3A-3B, as shown, include four operational stages 301-304. In stage 301, the communication device 311 may send a connection request 321 to the communication device 312. The communication devices 311 and 312 may be located, for example, on land, in an aircraft, or on a ship. The communication devices 311 and 312 may be wireless or wired. The communication devices 311 and 312 may communicate with one or more satellites 120 of a satellite constellation using the antennas 313 and 314, respectively.

The antennas 313 and 314 may be satellite dishes, phased array antennas, etc. The antennas 313 and 314 may be part of the communication devices 311 and 312. Alternatively, the antennas 313 and 314 may be connected to corresponding gateway devices 315 and 316, through which the communication devices 311 and 312 may communicate with the satellites 120. It should be noted that the antennas 313 and 314 and the gateway devices 315 and 316 are trusted user equipment (e.g., in premises equipment) and are not parts of ground infrastructure that may be tampered by the third parties.

As a non-limiting example, the communication device 311 may be located on a ship in Pacific Ocean and the communication device 312 may belong to a bank in London. The person using the communication device 311 may want to connect to the communication device 312 to perform a transaction with the bank. As shown in stage 301, the connection request 321 may be sent from the communication device 311 to a communication satellite 120 that is passing over the area where the communication device 311 is located. If the communication device 312 is also within the area that is accessible by the same satellite 120, the satellite 120 may directly send the connection request to the communication device 312. Otherwise, the satellite 120 may send the connection request 321 to the communication device 312 through one or more other satellites 120 of the satellite constellation.

In stage 302, the communication device 312 may validate the connection request from the communication device 311. For example, the communication device 312 of the bank may validate that the request is received from an account holder of the bank. As indicated above with reference to FIG. 2, the key generating satellite, in some embodiments, may validate communication devices. In these embodiments, the communication device 312 may use the key generating satellite 111 to validate the communication device 311.

As shown in stage 302, the communication device 312 may send a request 322 for encryption keys generated by the key generating satellite 111. The request 322 may be picked up by a satellite 120 of satellite the constellation that is above the area where the communication device 312 is located. Depending on whether the satellite 120 has a direct link to the key generation satellite 111, the satellite 120 may send the request 322 either directly, or through one or more other satellites 120 of the satellite constellation, to the key generating satellite 111. The request may include the identification of the communication devices 311 and 312.

In stage 303, the key generating satellite 111 may generate a pair of encryption keys 323 and 324 using only the onboard hardware and software key generation assets of the key generating satellite. For example, and without limitations, the key generating satellite 111, in some embodiments, may include an encryption key generator 235 that generates encryption keys, as described above with reference to FIG. 2. Each of the encryption keys 323 or 324 may include an individual key or several encryption keys to be used in different time slots.

As shown in stage 303, the key generating satellite 111 may send the encryption key 323 to the communication device 311 and the encryption key 324 to the communication device 312 through one or more satellites 120 of the satellite constellation. The key generating satellite 111 may not communicate with ground stations during key generation and key distribution process. In stage 304, the communication devices 311 and 312 may use their corresponding encryption keys 323 and 324 to exchange encrypted signals (e.g., voice and/or data) using one or more satellites 120 of the satellite constellation.

It should be noted that the communication between the communication devices 311-312 in stages 301-304 only goes through the direct link between the key generating satellite 111 and one or more communication satellites 120 without going through any ground infrastructure, which provides the technical advantage of avoiding the susceptibility of the ground infrastructure to signal jamming, spoofing, data interception, and cyberattacks. In other words, the communication satellites 120, the key generating satellite 111, and any backup or standby key generating satellites create a direct routing satellite network system where communication between two consecutive satellites in a communication loop goes through direct laser or RF link between the two satellites without going through any terrestrial networks or ground infrastructure. Similarly, in other example embodiments described below with reference to FIGS. 3C-3D, 6A-6D, 6E-6H, 9A-9B, 9C-9D, 12A-12B, and 12C-12D the communication between the communication devices 311-312 only goes through the direct link between one or more satellites without going through any terrestrial networks or ground infrastructure.

Figure 3C:
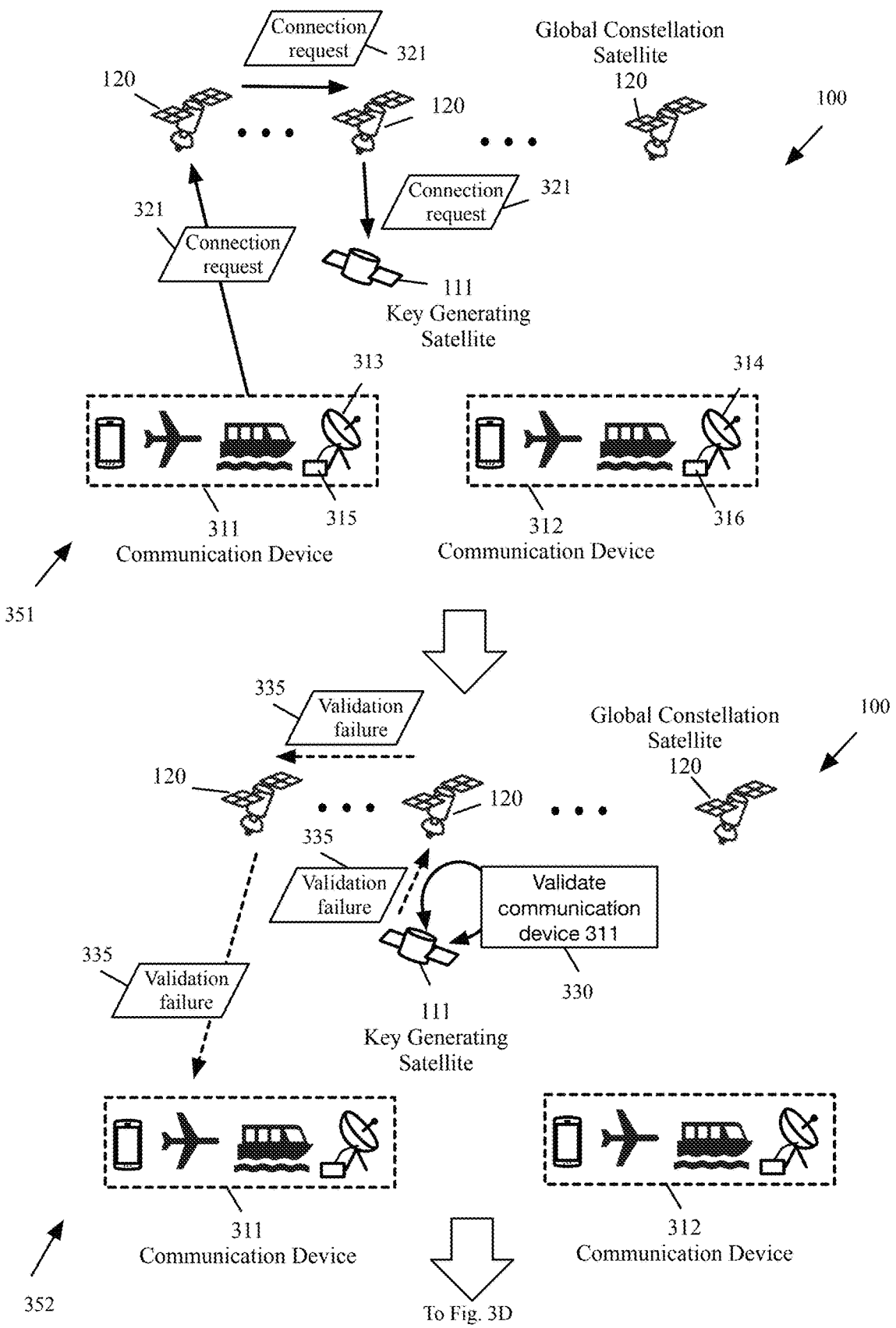
FIGS. 3C-3D are function diagrams illustrating an alternative sequence of actions performed by the key generating satellite of FIG. 1 to generate encryption keys for a communication session between two communication devices, according to various aspects of the present disclosure.
Figure 3D:
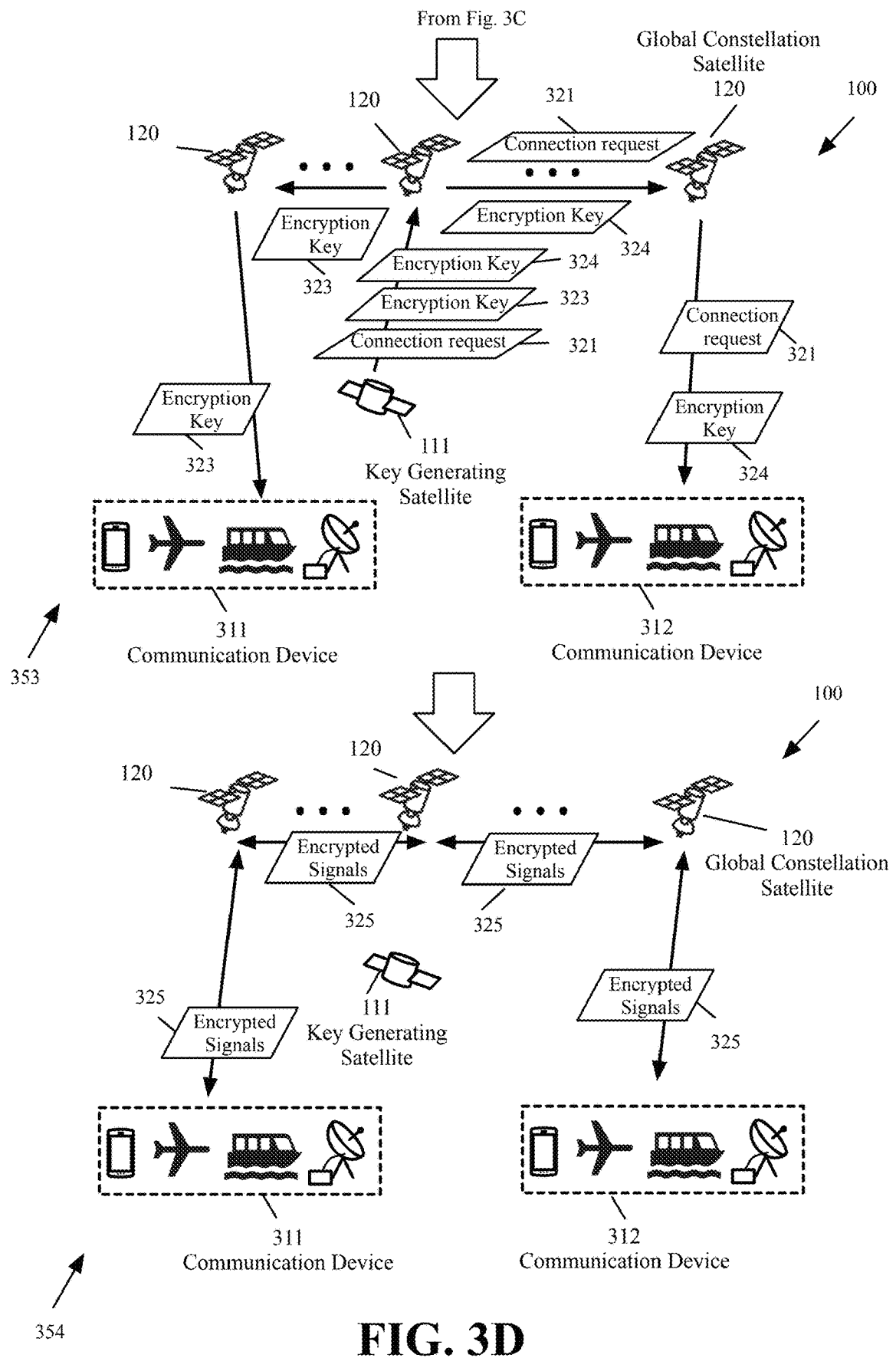

FIGS. 3C-3D are function diagrams illustrating an alternative sequence of actions performed by the key generating satellite of FIG. 1 to generate encryption keys for a communication session between two communication devices, according to various aspects of the present disclosure. Communication devices 311-312, antennas 313-314, and gateway devices 315-316 may be similar to corresponding items in 3A-3B.

FIGS. 3C-3D, as shown, include four operational stages 351-354. In stage 351, the communication device 311 may send a connection request 321 to the communication device 312. The communication devices 311 and 312 may be located, for example, on land, in an aircraft, or on a ship. The communication devices 311 and 312 may be wireless or wired. The communication devices 311 and 312 may communicate with one or more satellites 120 of a satellite constellation using the antennas 313 and 314, respectively.

In stage 351, the communication device 311 may send a connection request 321 to the communication device 312. The connection request 321 may be sent from the communication device 311 to a communication satellite 120 that is passing over the area where the communication device 311 is located. The connection request may include the identification of the communication device 311, the communication device 312, and the key generating satellite 111. For example, the connection request may be initiated through an App in the communication device 311, which may add the identification of the communication devices 311-312 and the key generating satellite 111 to the connection request. Depending on the application, the App may also include other information, such as username and password, biometric information, account numbers, etc., that may be required to validate the credentials of communication device 311.

The global communication satellite 120 may send the connection request 321 to the key generating satellite 111 either directly (if a direct link exists between the two satellites) or through one or more other global communication satellites 120 and/or one or more key generating satellites (e.g., one or more backup key generating satellites 112 shown in FIG. 1).

In stage 352, the key generating satellite 111 may validate the credentials of the communication device 311, for example, as described above with reference to FIG. 2. When the validation fails, the key generating satellite 111 may optionally send a validation failure message 335 to the communication device 311 through one or more global communication satellites 520.

When the validation is successful, the key generating satellite 111, in stage 353, may generate a pair of encryption keys 323 and 324 using only the onboard hardware and software key generation assets of the key generating satellite. For example, and without limitations, the key generating satellite 111, in some embodiments, may include an encryption key generator 235 that generates encryption keys, as described above with reference to FIG. 2.

The key generating satellite 111 may send the encryption key 323 to the communication device 311 through one or more satellites 120 of the satellite constellation. The key generating satellite 111 may send the encryption key 324 and the connection request 321 to the communication device 312 through one or more satellites 120 of the satellite constellation. The key generating satellite 111 may not communicate with ground stations during key generation and key distribution process.

In stage 354, the communication devices 311 and 312 may use their corresponding encryption keys 323 and 324 to exchange encrypted signals (e.g., voice and/or data) using one or more satellites 120 of the satellite constellation. It should be noted that the communication between the communication devices 311-312 in stages 351-354 only goes through the direct link between the key generating satellite 111 and one or more global communication satellites 120 without going through any ground infrastructure, which provides the technical advantage of avoiding the susceptibility of the ground infrastructure to signal jamming, spoofing, data interception, and cyberattacks.

Figure 4A:
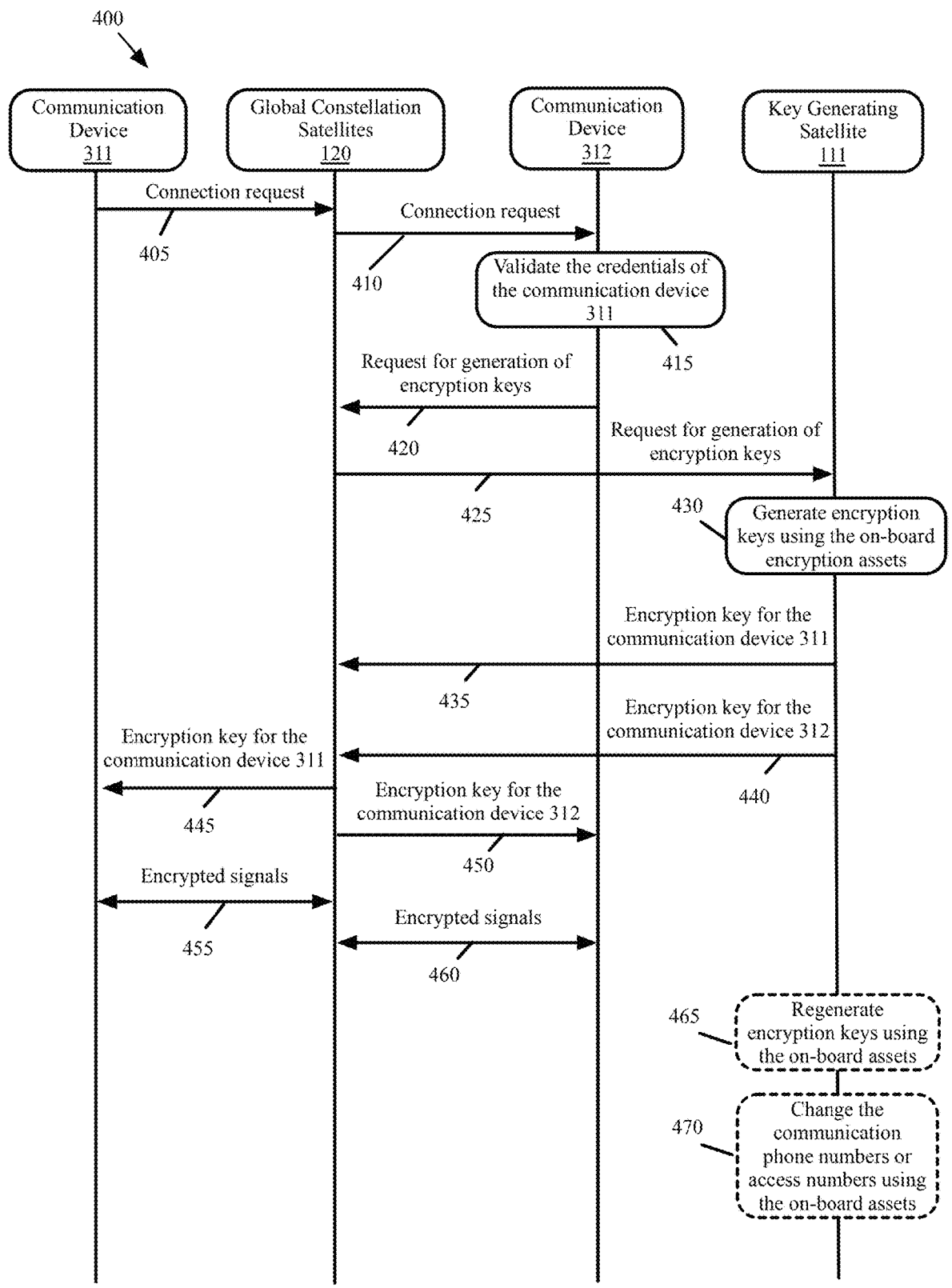
FIG. 4A is an example sequence diagram illustrating data items exchanged for establishing a communication link between the two communication devices of FIGS. 3A-3B, according to various aspects of the present disclosure.

FIG. 4A is an example sequence diagram 400 illustrating data items exchanged for establishing a communication link between the two communication devices 311 and 312 of FIGS. 3A-3B, according to various aspects of the present disclosure. With reference to FIG. 4A, the communication devices 311-312, the key generating satellite 111, and the global constellation satellites 120 may be similar to the corresponding devices of FIGS. 3A-3B.

The communication device 312 may send (at step 405) a request to connect to the communication device 312 to a satellite 120 of a satellite constellation. The connection request may be sent (at step 410) to the communication device 312 through one or more satellites 120 of the satellite constellation. For example, the connection request may be sent to the communication device 312 as described above with reference to stage 301 of FIG. 3A.

The communication device 312 may validate (at block 415) the credentials of the communication device 311. In the banking example discussed above, the connection request may be a login request that may include a username and password. The communication device 312 may validate that the username and password belongs to an account holder of the bank. As another example, the connection request may be a phone call and the communication device 312 may validate that the phone call is initiated by a phone number that is recognized as a phone number of an account holder of the bank. As indicated above with reference to FIG. 2, the key generating satellite, in some embodiments, may validate communication devices. In these embodiments, the validation of the communication device 311 may be performed by the key generating satellite 110 using data stored in the computer readable media 220 of the key generating satellite.

After validating the credentials of the communication device 311, the communication device 312 may send a request (at step 420) for generation of encryption keys to the key generating satellite 111 through one or more global constellation satellites 120. The global constellation satellite(s) 120 may deliver (at step 425) the request for encryption keys to the key generating satellite 111.

The key generating satellite 111 may generate (at block 430) encryption keys using the on-board encryption assets. The key generating satellite 111 may send (at step 435) an encryption key to the communication device 311 through one or more global constellation satellites 120. The key generating satellite 111 may send (at step 440) an encryption key to the communication device 312 through one or more global constellation satellites 120.

The global constellation satellite(s) 120 may deliver (at step 445) the encryption key of the communication device 311 to the communication device 311. The global constellation satellite(s) 120 may deliver (at step 450) the encryption key of the communication device 312 to the communication device 312. The communication devices 311 and 312 may then exchange encrypted signals (at steps 455-460) through one or more global constellation satellites 120. Upon completion of the final session, one of the communication devices may send (e.g., at the end of the signal exchange 455-460) an encrypted "end of session" signal to the key generating satellite and the other communication device and all connections and encryption keys may be dropped.

In some embodiments, the key generating satellite 111 may regenerate (at block 465) the encryption keys using the on-board assets and may send the regenerated encryption keys to the corresponding communication devices 311-312 through one or more global constellation satellites 120 (e.g., as shown in steps 435-450). In some embodiments, the key generating satellite 111 may change (at block 470) the communication phone numbers or satellite access numbers using the on-board assets and may send the changed communication phone numbers or satellite access numbers to the corresponding communication devices 311-312 through one or more global constellation satellites 120 (e.g., as shown in steps 435-450).

For example, in some embodiments, the communication device 312 may request the key generating satellite 111 to regenerate the encryption keys and/or to change the communication phone number or satellite access number. In some embodiments, the communication device 312 may include the request for key regeneration and/or to changing the communication phone number or satellite access number in the initial request for generation of encryption keys. In other embodiments, the communication device 312 may periodically request the key generating satellite 111 to regenerate the encryption keys and/or to change the communication phone number or satellite access number. Yet, in other embodiments, the key generating satellite 111 may be configured to regenerate the encryption keys and/or to change the communication phone number or satellite access number after a certain time period.

Figure 4B:
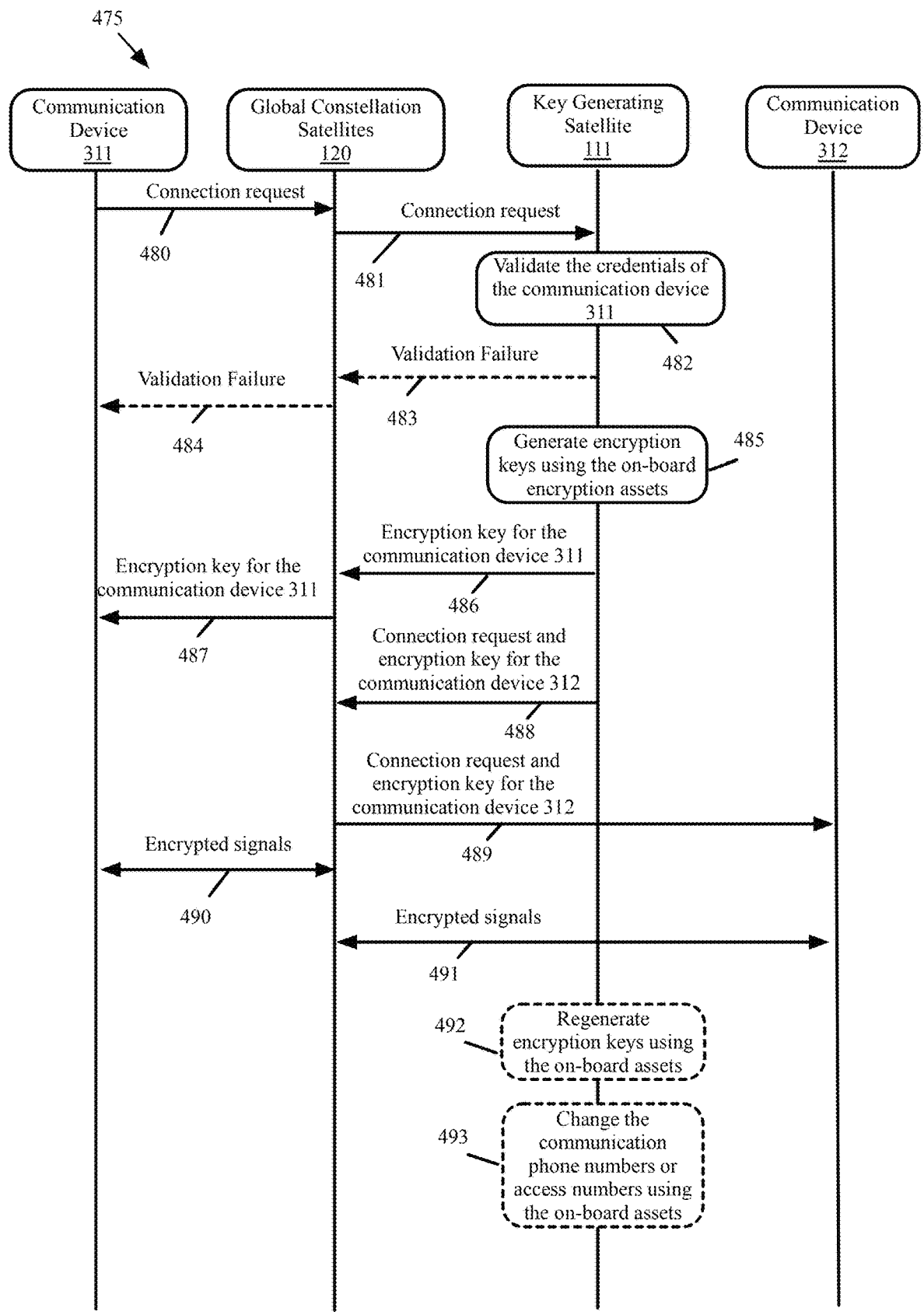
FIG. 4B is an example sequence diagram 475 illustrating data items exchanged for establishing a communication link between the two communication devices of FIGS. 3C-3D, according to various aspects of the present disclosure.

FIG. 4B is an example sequence diagram 475 illustrating data items exchanged for establishing a communication link between the two communication devices 311 and 312 of FIGS. 3C-3D, according to various aspects of the present disclosure. With reference to FIG. 4B, the communication devices 311-312, the key generating satellite 111, and the global constellation satellites 120 may be similar to the corresponding devices of FIGS. 3C-3D.

The communication device 312 may send (at step 480) a request to connect to the communication device 312 to a global communication satellite 120. The connection request may include the identification of the communication device 311, the communication device 312, and the key generating satellite 111. The connection request may be sent (at step 481) from the satellite 120 to the key generating satellite 111. If there is no direct satellite link between the satellite 120 and the key generating satellite 111, the request may be sent through one or more other global communication satellites 120 (e.g., as shown in FIG. 3C).

The key generating satellite 111 may validate (at block 482) the credentials of the communication device 311. In the banking example discussed above, the connection request may be a login request that may include a username and password. The key generating satellite 111 may validate that the username and password belongs to an account holder of the bank. As another example, the connection request may be a phone call and the key generating satellite 111 may validate that the phone call is initiated by a phone number that is recognized as a phone number of an account holder of the bank. As indicated above with reference to FIG. 2, the key generating satellite may validate the credentials of the communication device 311 using data stored in the computer readable media 220 of the key generating satellite 111.

When the validation fails, the key generating satellite 111 may optionally send (at steps 483-484) a validation failure message to the communication device 311 through one or more global communication devices 120. When the validation is successful, the key generating satellite 111 may generate (at block 485) encryption keys using the on-board encryption assets. The key generating satellite 111 may send (at steps 486-487) an encryption key to the communication device 311 through one or more global constellation satellites 120. The key generating satellite 111 may send (at steps 488-489) the connection request and an encryption key to the communication device 312 through one or more global constellation satellites 120. The key generating satellite 111 may send the connection request and the encryption key to the communication device 312 in one or multiple messages. The communication devices 311 and 312 may then exchange encrypted signals (at steps 490-491) through one or more global constellation satellites 120. Upon completion of the final session, one of the communication devices may send (e.g., at the end of the signal exchange 490-491) an encrypted "end of session" signal to the key generating satellite and the other communication device and all connections and encryption keys may be dropped.

In some embodiments, the key generating satellite 111 may regenerate (at block 492) the encryption keys using the on-board assets and may send the regenerated encryption keys to the corresponding communication devices 311-312 through one or more global constellation satellites 120 (e.g., as shown in steps 486-490). In some embodiments, the key generating satellite 111 may change (at block 493) the communication phone numbers or satellite access numbers using the on-board assets and may send the changed communication phone numbers or satellite access numbers to the corresponding communication devices 311-312 through one or more global constellation satellites 120 (e.g., as shown in steps 486-490).

For example, in some embodiments, the key generating satellite 111 may regenerate the encryption keys and/or change the communication phone number or satellite access number. In some embodiments, the connection request 480 may include the request for key regeneration and/or changing the communication phone number or satellite access number. In other embodiments, the communication device 312 may periodically request the key generating satellite 111 to regenerate the encryption keys and/or to change the communication phone number or satellite access number. Yet, in other embodiments, the key generating satellite 111 may be configured to regenerate the encryption keys and/or to change the communication phone number or satellite access number after a certain time period.

FIG. 5 is a functional diagram illustrating a communication system 500 that includes a constellation of encryption key generating satellites and a constellation of GEO or MEO communication satellites, according to various aspects of the present disclosure. With reference to FIG. 5, the communication system 500 may include a constellation of encryption key generating satellites 510-520 and several geostationary equatorial orbit (GEO) or MEO satellites 530. GEO satellites may orbit around Earth at an altitude of 35,786 km (22,236 mi) above sea level and May match the Earth's rotation rate, so they remain in a fixed position relative to the Earth's surface. An example of GEO satellites is Thuraya, which provides mobile satellite services.

At least one key generating satellite, for example, the key generating satellite 510, may be active at each time and may generate encryption keys. The other key generating satellite(s), for example, the key generating satellites 520 may function as backup key generating satellites. In some embodiments, at least one of the backup key generating satellites 520 may function as a hot standby and may take over the function of the active key generating satellite if the active key generating satellite suffers a failure or is taken offline.

The key generating satellites 510-520 may share a common orbital plane 525. The key generating satellites 510-520 may communicate with other satellites using FSO (e.g., laser beams) or radio frequency beams. The key generating satellites 510-520 may also act as relays to carry both the keys and the data from one GEO or MEO satellite 530 to another GEO or MEO satellite 530 in a different location. The key generating satellites 510-520 may act and operate as a relay to interconnect the GEO or MEO satellites 530 to each other if the users are in different locations and therefore have different GEO or MEO satellite coverage.

FIGS. 6A-6D are functional diagrams illustrating a sequence of actions performed by the key generating satellite of FIG. 5 for generating encryption keys for a communication session between two communication devices, according to various aspects of the present disclosure. With reference to FIGS. 6A-6D, the communication devices 311 and 312 may be similar to the communication devices 311 and 312 of FIGS. 3A-3B.

FIGS. 6A-6D, as shown, include four operational stages 601-604. In stage 601, the communication device 311 may send a connection request 321 to the communication device 312. The connection request 321 may be sent from the communication device 311 to a GEO or MEO communication satellite 520 that covers the area where the communication device 311 is located. If the communication device 312 is also within the area that is accessible by the same GEO or MEO communication satellite 530, the satellite 530 may directly send the connection request to the communication device 312. Otherwise, the satellite 530 may send the connection request 321 to the communication device 312 through one or more key generating satellites 510-520 of the key generation satellite constellation to another GEO or MEO satellite 530. The other GEO or MEO satellite 530 may then send the connection request 321 to the communication device 312.

As shown in stage 602, the communication device 312 may send a request 322 for encryption keys generated by the key generating satellite 510. The request 322 may be picked up by a GEO or MEO satellite 530 that is above the area where the communication device 312 is located. Depending on whether the satellite 530 has a direct link to the key generation satellite 510, the satellite 530 may send the request 322 either directly, or through one or more slave key generating satellites 520 of the key generating satellite constellation to the key generating satellite 510. The request may include the identification of the communication devices 311 and 312.

In stage 603, the key generating satellite 510 may generate a pair of encryption keys 323 and 324 using only the onboard hardware and software key generation assets. For example, and without limitations, the key generating satellite 510, in some embodiments, may include an encryption key generator 235 that generates encryption keys as described above with reference to FIG. 2. The key generating satellites 510-520 may not communicate with ground stations during key generation and key distribution process.

As shown in stage 603, the key generating satellite 510 may send the encryption key 323 to the communication device 311 and the encryption key 324 to the communication device 312 through one or more GEO or MEO satellites 530 and one or more salve key generating satellites 520 (e.g., if there is no direct link between the key generating satellite 510 and the GEO or MEO satellites 530). In stage 604, the communication devices 311 and 312 may use their corresponding encryption keys 323 and 324 to exchange encrypted signals (e.g., voice and/or data) using one or more of the GEO or MEO satellites 530 and one or more key generating satellites 510-520.

It should be noted that the communication between the communication devices 311-312 in stages 601-604 only goes through the direct link between one or more key generating satellites 520 and one or more GEO or MEO satellites 530 without going through any ground infrastructure, which provides the technical advantage of avoiding the susceptibility of the ground infrastructure to signal jamming, spoofing, data interception, and cyberattacks.

FIGS. 6E-6H are functional diagrams illustrating an alternative sequence of actions performed by the key generating satellite of FIG. 5 for generating encryption keys for a communication session between two communication devices, according to various aspects of the present disclosure. With reference to FIGS. 6E-6H, the communication devices 311 and 312 may be similar to the communication devices 311 and 312 of FIGS. 6A-6D.

FIGS. 6E-6H, as shown, include four operational stages 651-654. In stage 601, the communication device 311 may send a connection request 321 to the communication device 312. The connection request 321 may be sent from the communication device 311 to a GEO or MEO communication satellite 530 that covers the area where the communication device 311 is located.

The connection request may include the identification of the communication device 311, the communication device 312, and the key generating satellite 510. For example, the connection request may be initiated through an App in the communication device 311, which may add the identification of the communication devices 311-312 and the key generating satellite 510 to the connection request. Depending on the application, the App may also include other information, such as username and password, biometric information, account numbers, etc., that may be required to validate the credentials of communication device 311.

The GEO or MEO communication satellite 530 may send the connection request 321 to the key generating satellite 510 either directly (if a direct link exists between the two satellites) or through one or more other key generating satellites 520 (e.g., one or more slave key generating satellites 520 shown in FIG. 5).

In stage 652, the active key generating satellite 510 may validate the credentials of the communication device 311, for example, as described above with reference to FIG. 2. When that the validation fails, the key generating satellite 510 may optionally send a validation failure message 335 to the communication device 311 through the GEO or MEO satellite 530. When there is no direct connections between the two satellites 510 and 530, the connection failure message 335 may go through one or more slave key generating satellites 520.

When the validation is successful, the key generating satellite 510, in stage 653, may generate a pair of encryption keys 323 and 324 using only the onboard hardware and software key generation assets of the key generating satellite. For example, and without limitations, the key generating satellite 111, in some embodiments, may include an encryption key generator 235 that generates encryption keys, as described above with reference to FIG. 2.

The key generating satellite 510 may send the encryption key 323 to the communication device 311 through a GEO or MEO satellite 530 and, if there is no direct link between the satellites 510 and 530, through one or more slave key generating satellites 520. The key generating satellite 510 may send the encryption key 324 and the connection request 321 to the communication device 312 through a GEO or MEO satellite 530 and, if there is no direct link between the satellites 510 and 530, through one or more slave key generating satellites 520. The key generating satellite 111 may not communicate with ground stations during key generation and key distribution process.

In stage 654, the communication devices 311 and 312 may use their corresponding encryption keys 323 and 324 to exchange encrypted signals (e.g., voice and/or data) using one or more GEO or MEO satellites 530. If the communication devices 311-312 are not covered by the same GEO or MEO satellite, the encrypted signals may be sent between two GEO or MEO satellites 530 and one or more key generating satellites 510 or 520.

It should be noted that the communication between the communication devices 311-312 in stages 651-654 only goes through the direct link between the key generating satellite 111 and one or more global communication satellites 120 without going through any ground infrastructure, which provides the technical advantage of avoiding the susceptibility of the ground infrastructure to signal jamming, spoofing, data interception, and cyberattacks.

Figure 7A:
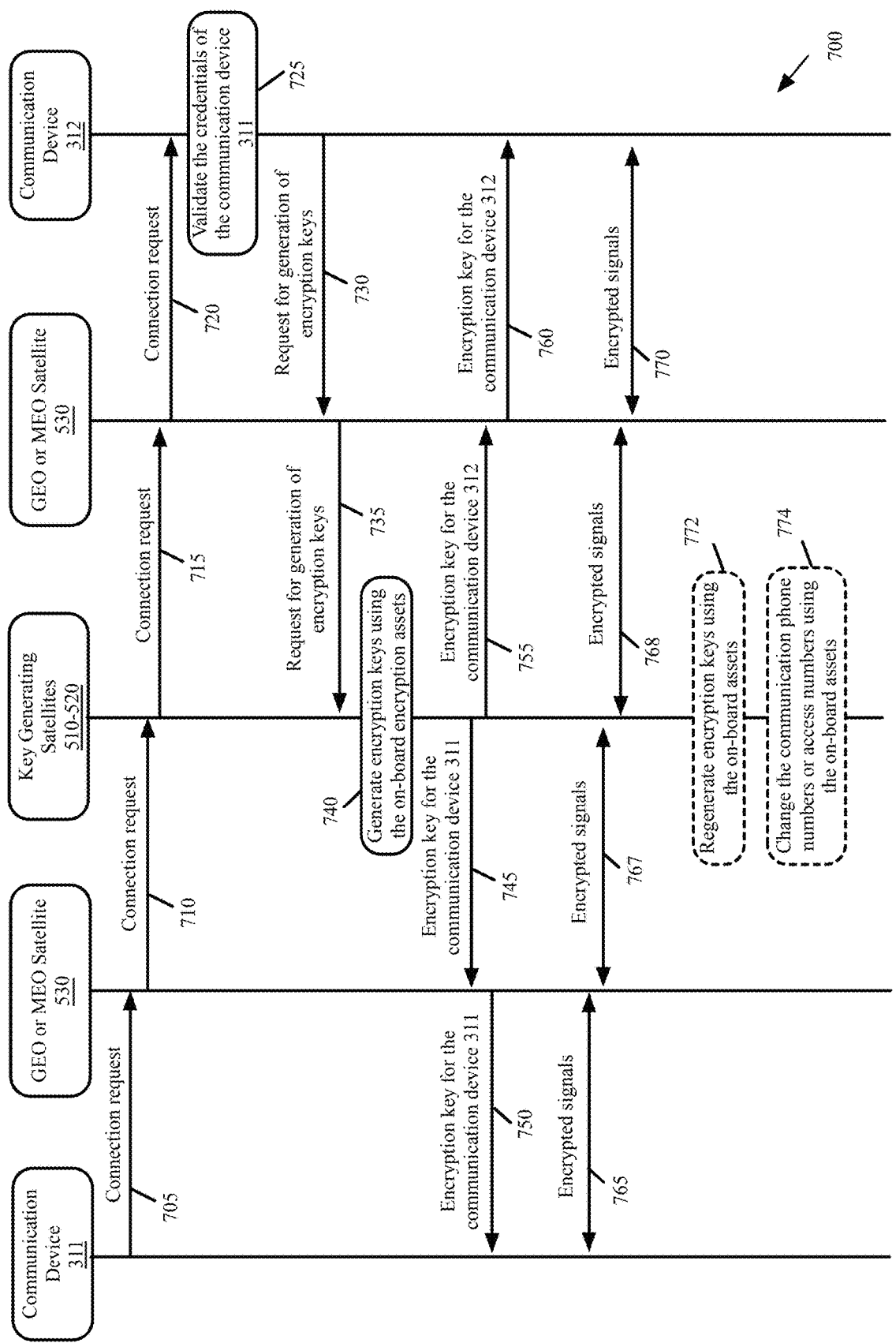
FIG. 7A is an example sequence diagram illustrating data items exchanged for establishing a communication link between the two communication devices FIGS. 6A-6D, according to various aspects of the present disclosure.

FIG. 7A is an example sequence diagram 700 illustrating data items exchanged for establishing a communication link between the two communication devices 311 and 312 of FIGS. 6A-6D, according to various aspects of the present disclosure. With reference to FIG. 7A, the communication devices 311-312, the key generating satellites 510-520, and GEO or MEO Satellite 530 may be similar to the corresponding devices of FIGS. 6A-6D.

The communication device 311 may send (at step 705) a connection request to the communication device 312 to a GEO or MEO satellite 530. The connection request may be sent (at steps 710-720) to the communication device 312 through one or more key generating satellites 510-520 of the key generating satellite constellation and a GEO or MEO satellite 530. For example, the connection request may be sent to the communication device 312 as described above with reference to stage 601 of FIG. 6A.

The communication device 312 may validate (at block 725) the credentials of the communication device 311. For example, the communication device 312 may validate the credentials of the communication device 311 as described above with reference to block 415 of FIG. 4A. As indicated above with reference to FIG. 2, the key generating satellite, in some embodiments, may validate communication devices. In these embodiments, the validation of the communication device 311 may be performed by the key generating satellite 510.

After validating the credentials of the communication device 311, the communication device 312 may send a request (at step 730) for encryption keys to the key generating satellite 510 through a GEO or MEO satellite 530. The GEO or MEO satellite 530 may deliver (at step 735) the request for encryption keys to the key generating satellite 510. If there is not direct link between the GEO or MEO satellite 530 and the key generating satellite 510, the GEO or MEO satellite 530 may send the request to the key generating satellite 510 though one or more salve key generating satellites 520, for example, as shown in stage 602 of FIG. 6B.

The key generating satellite 510 may generate (at block 740) encryption keys using the on-board encryption assets. The key generating satellite 510 may send (at step 745) an encryption key to the communication device 311 through a GEO or MEO satellite 530. If there is not direct link between the key generating satellite 510 and the GEO or MEO satellite 530 that covers the area where the communication device 311 is located, the key generating satellite 510 may send the encryption key though one or more salve key generating satellites 520 to the GEO or MEO satellite 530, for example, as shown in stage 603 of FIG. 6C. The GEO or MEO satellite 530 may deliver (at step 750) the encryption key of the communication device 311 to the communication device 311.

The key generating satellite 510 may send (at step 755) an encryption key to the communication device 312 through a GEO or MEO satellite 530. If there is not direct link between the key generating satellite 510 and the GEO or MEO satellite 530 that covers the area where the communication device 312 is located, the key generating satellite 510 may send the encryption key though one or more salve key generating satellites 520 to the GEO or MEO satellite 530, for example, as shown in stage 603 of FIG. 6C. The GEO or MEO satellite 530 may deliver (at step 760) the encryption key of the communication device 312 to the communication device 312. The communication devices 311 and 312 may then exchange encrypted signals (at steps 765-770) through one or more GEO or MEO satellites 530 and one or more key generating satellites 510-520. Upon completion of the final session, one of the communication devices may send (e.g., at the end of the signal exchange 765-770) an encrypted "end of session" signal to the key generating satellite and the other communication device and all connections and encryption keys may be dropped.

In some embodiments, the key generating satellite 510 may regenerate (at block 772) the encryption keys using the on-board assets. In some embodiments, the key generating satellite 510 may change (at block 774) the communication phone numbers or satellite access numbers using the on-board assets. For example, the key generating satellite 510 may regenerate the encryption keys and/or to change the communication phone number or satellite access number as described above with reference to blocks 465 and 470) of FIG. 4A, and may send the changed communication phone numbers or satellite access numbers to the corresponding communication devices 311-312 through one or more satellites (e.g., as shown in steps 745-760).

Figure 6A:
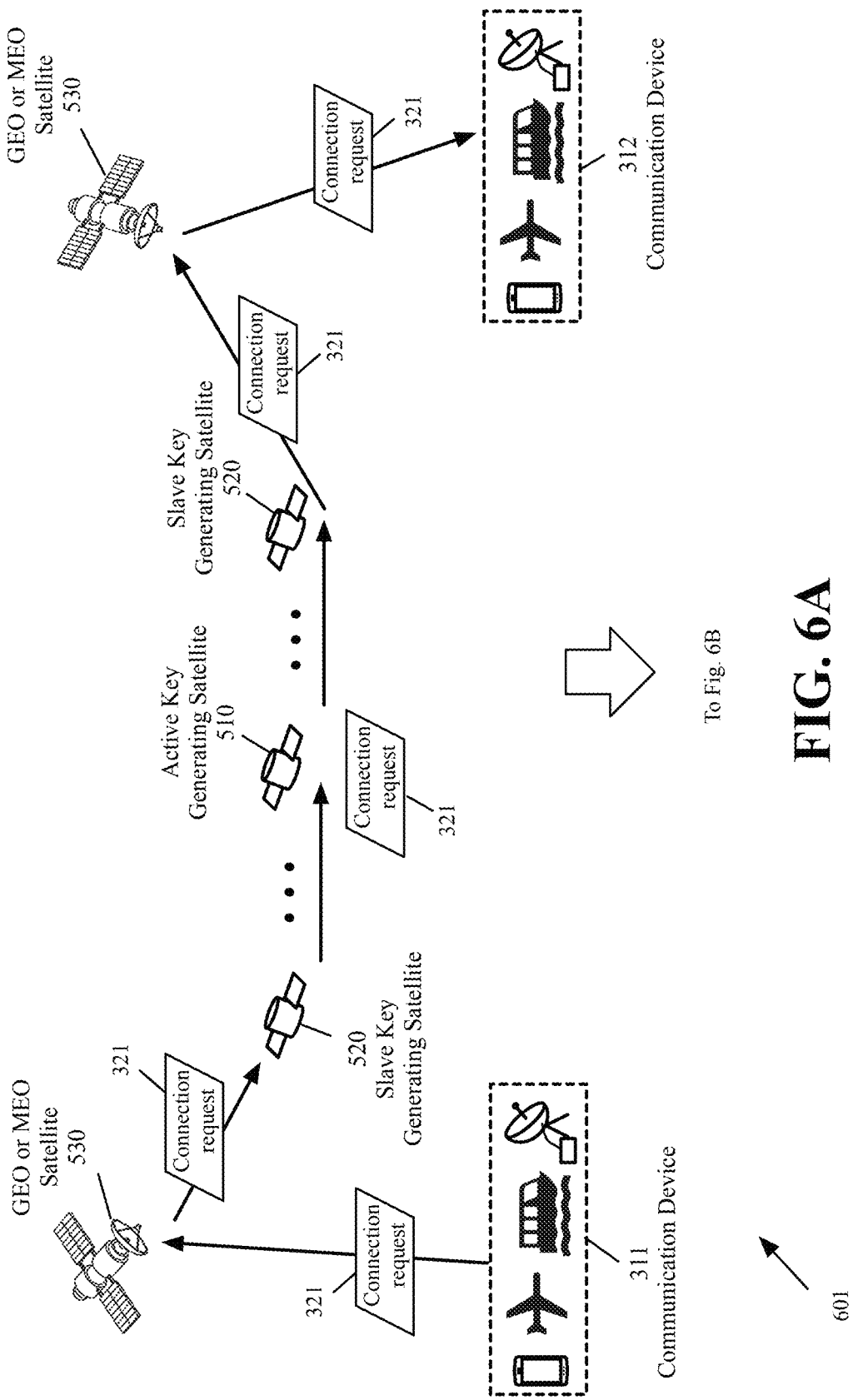
FIGS. 6A-6D are functional diagrams illustrating a sequence of actions performed by the key generating satellite of FIG. 5 for generating encryption keys for a communication session between two communication devices, according to various aspects of the present disclosure.
Figure 6B:
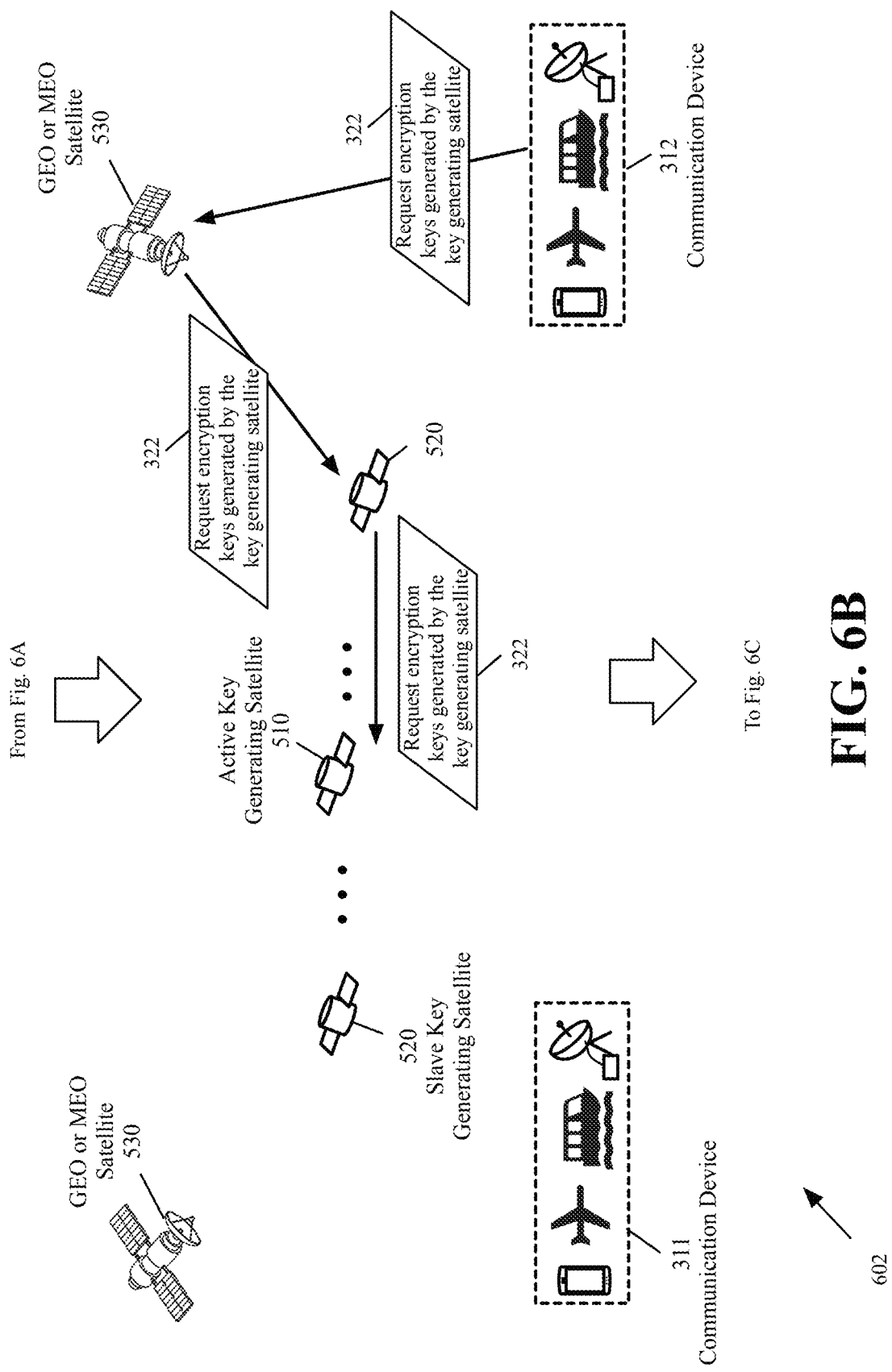
Figure 6C:
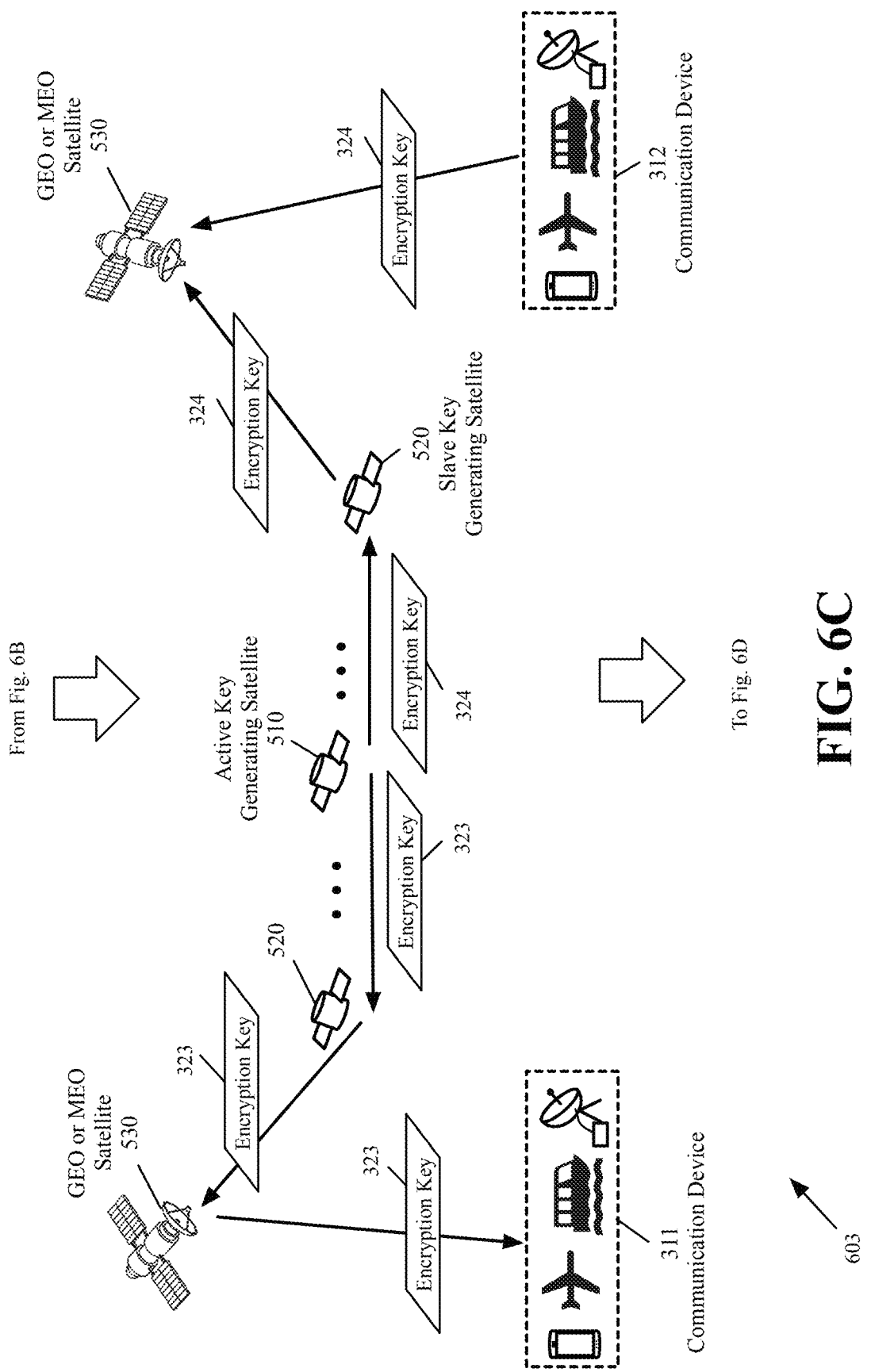
Figure 6D:
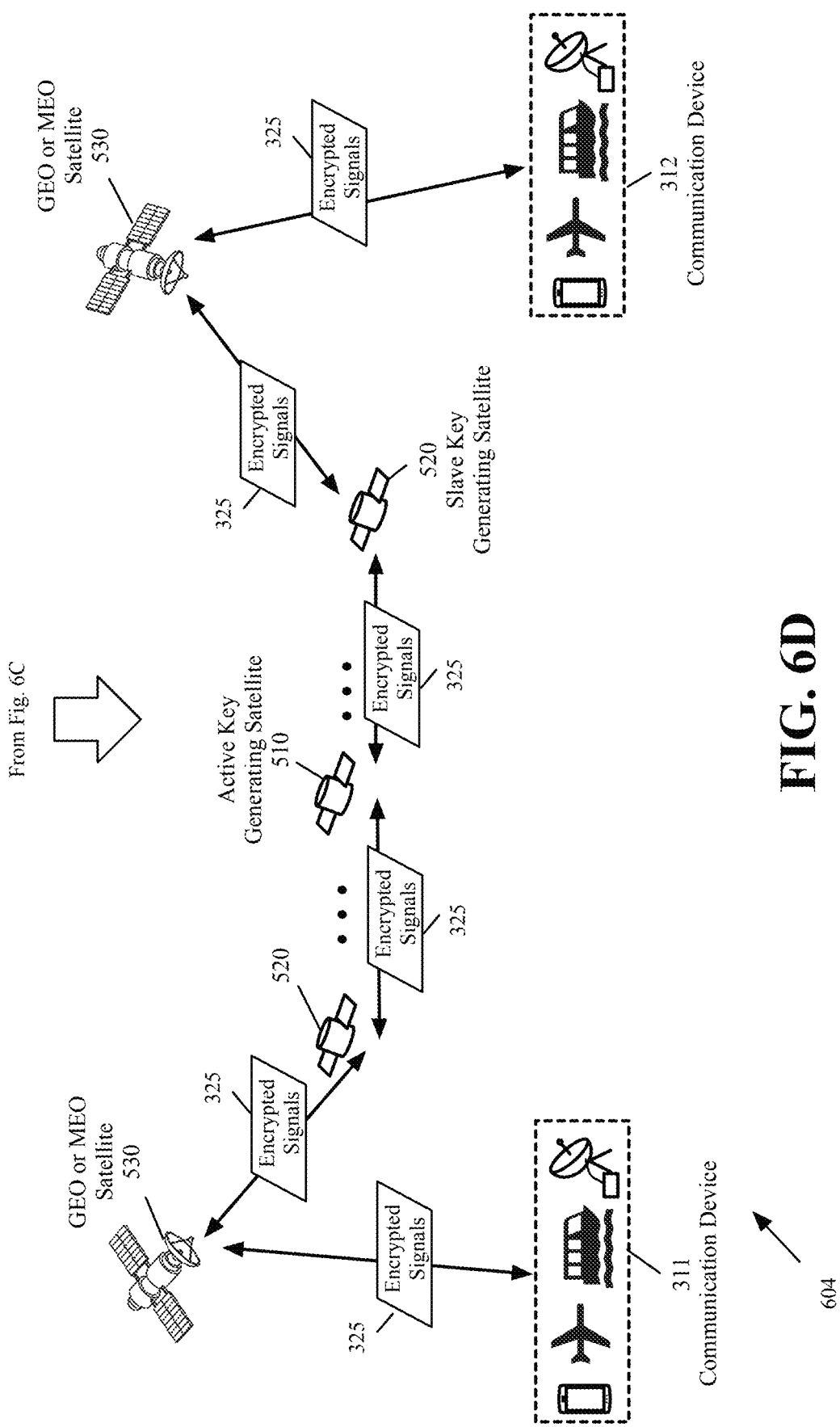
Figure 6E:
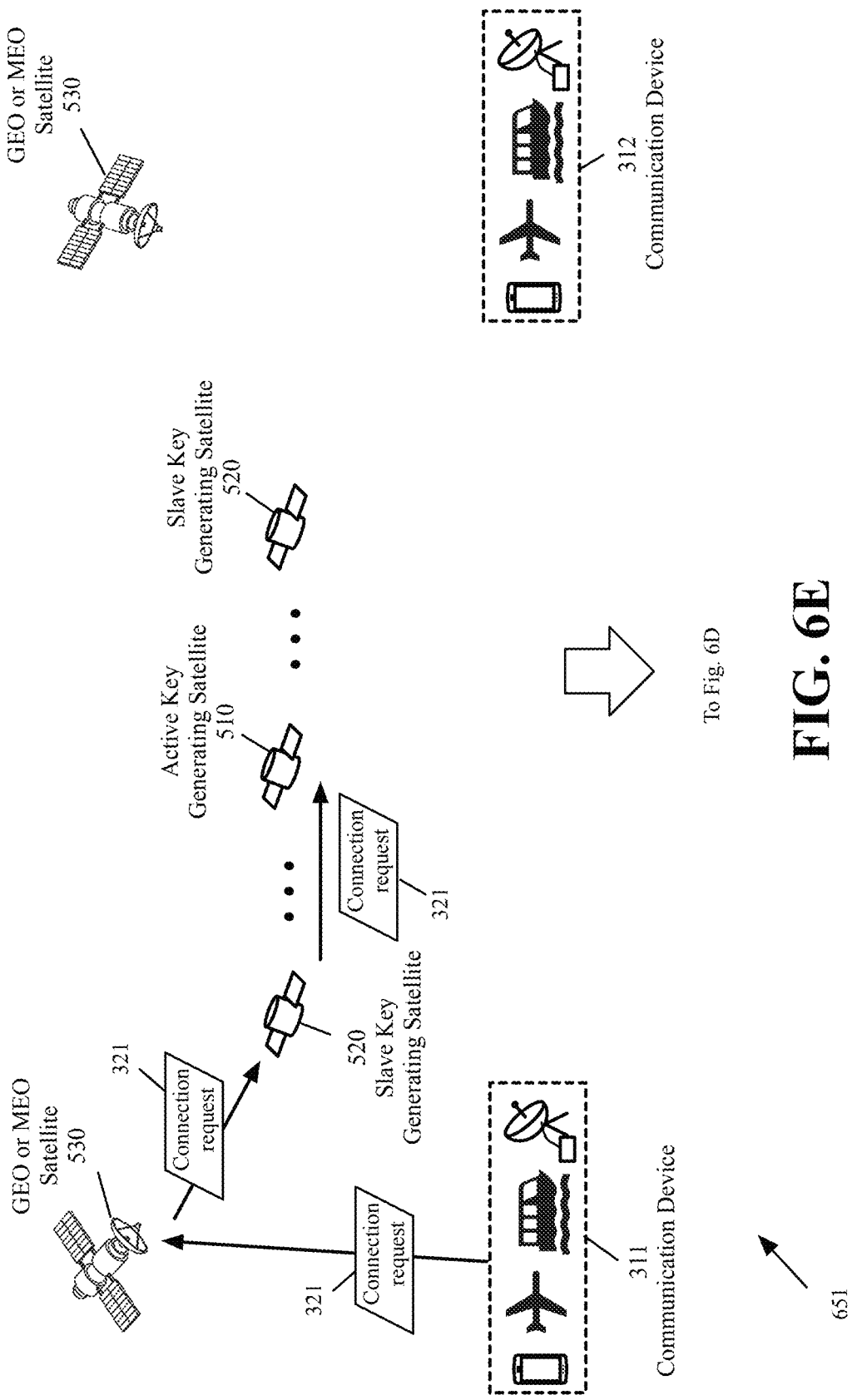
FIGS. 6E-6H are functional diagrams illustrating an alternative sequence of actions performed by the key generating satellite of FIG. 5 for generating encryption keys for a communication session between two communication devices, according to various aspects of the present disclosure.
Figure 6F:
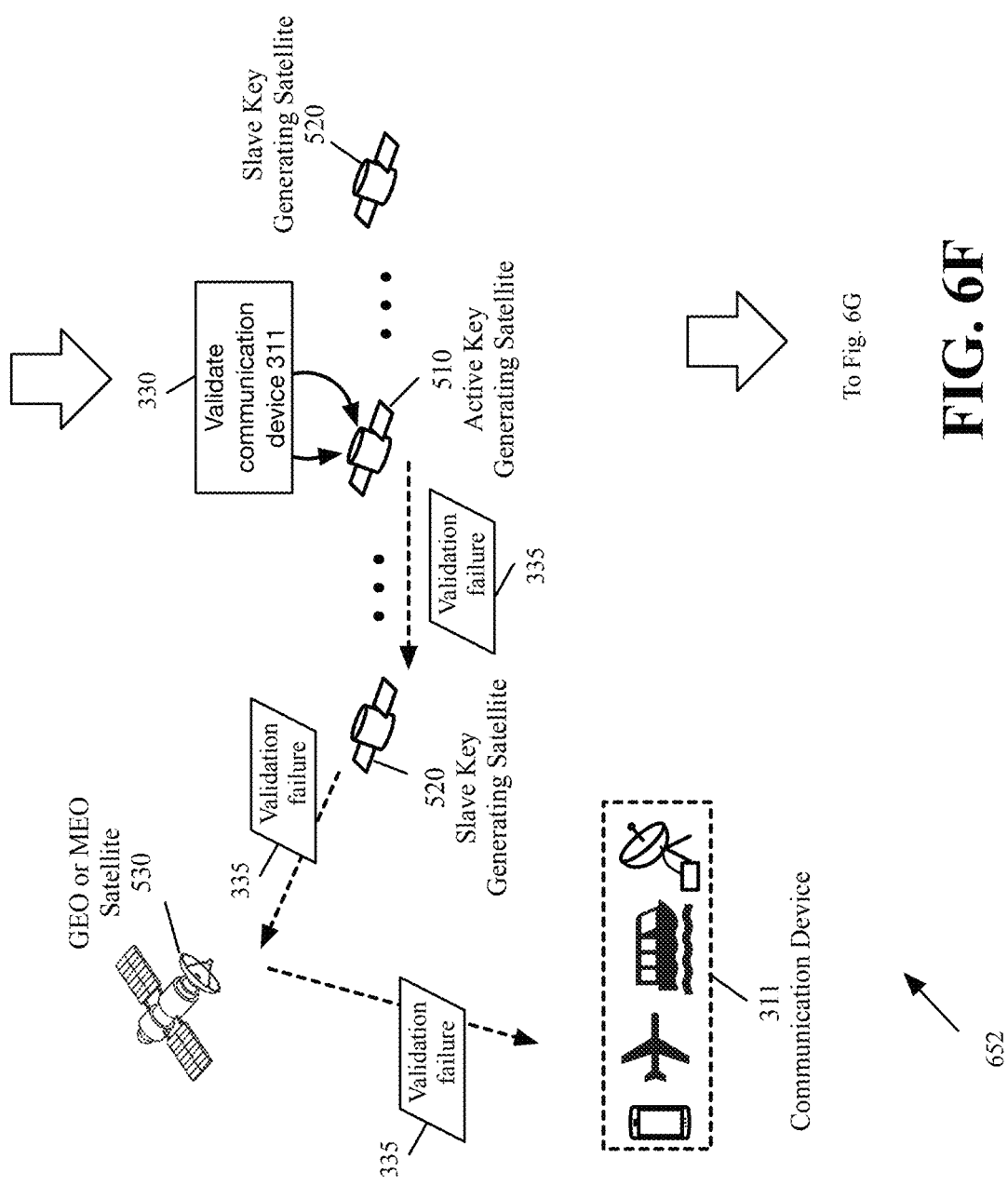
Figure 6G:
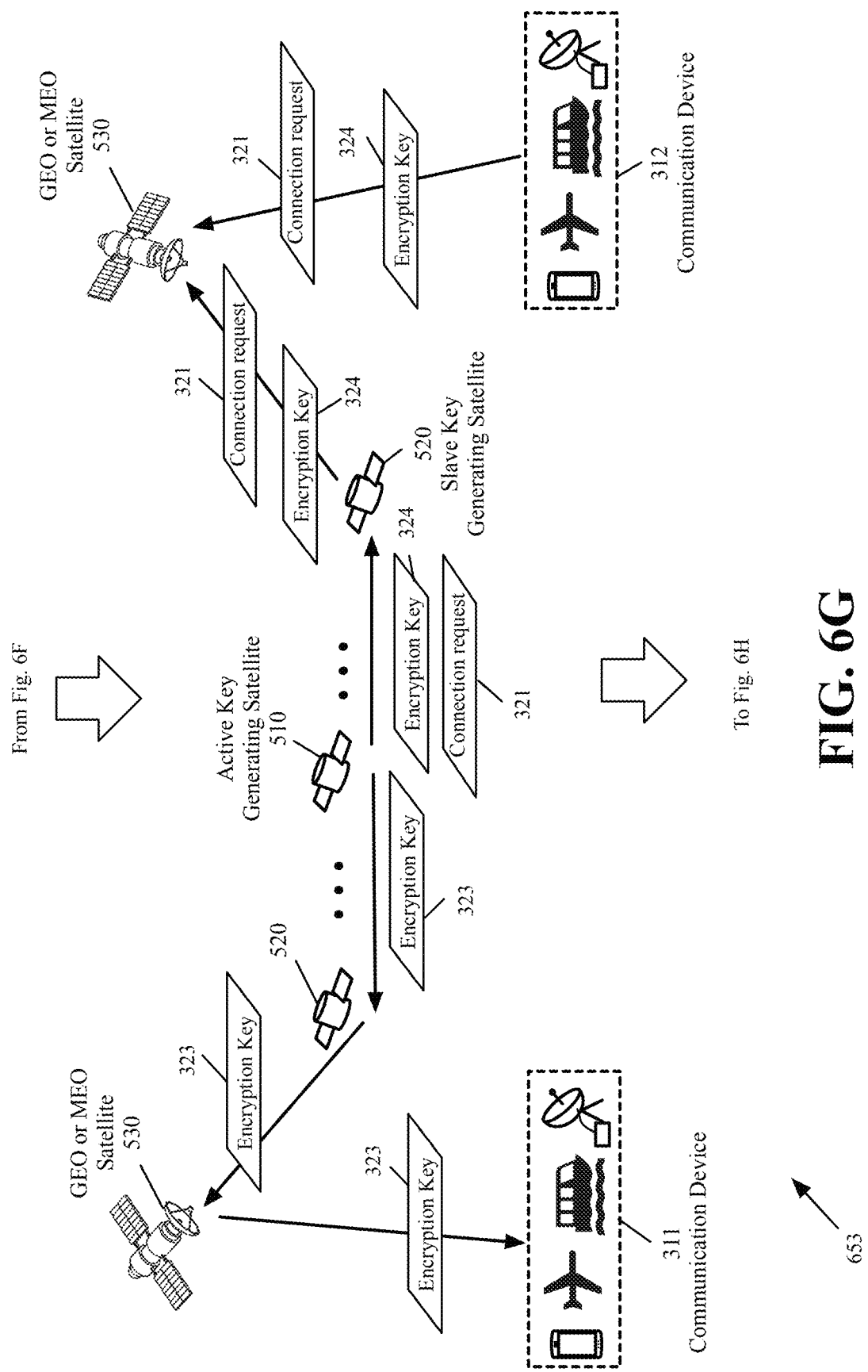
Figure 6H:
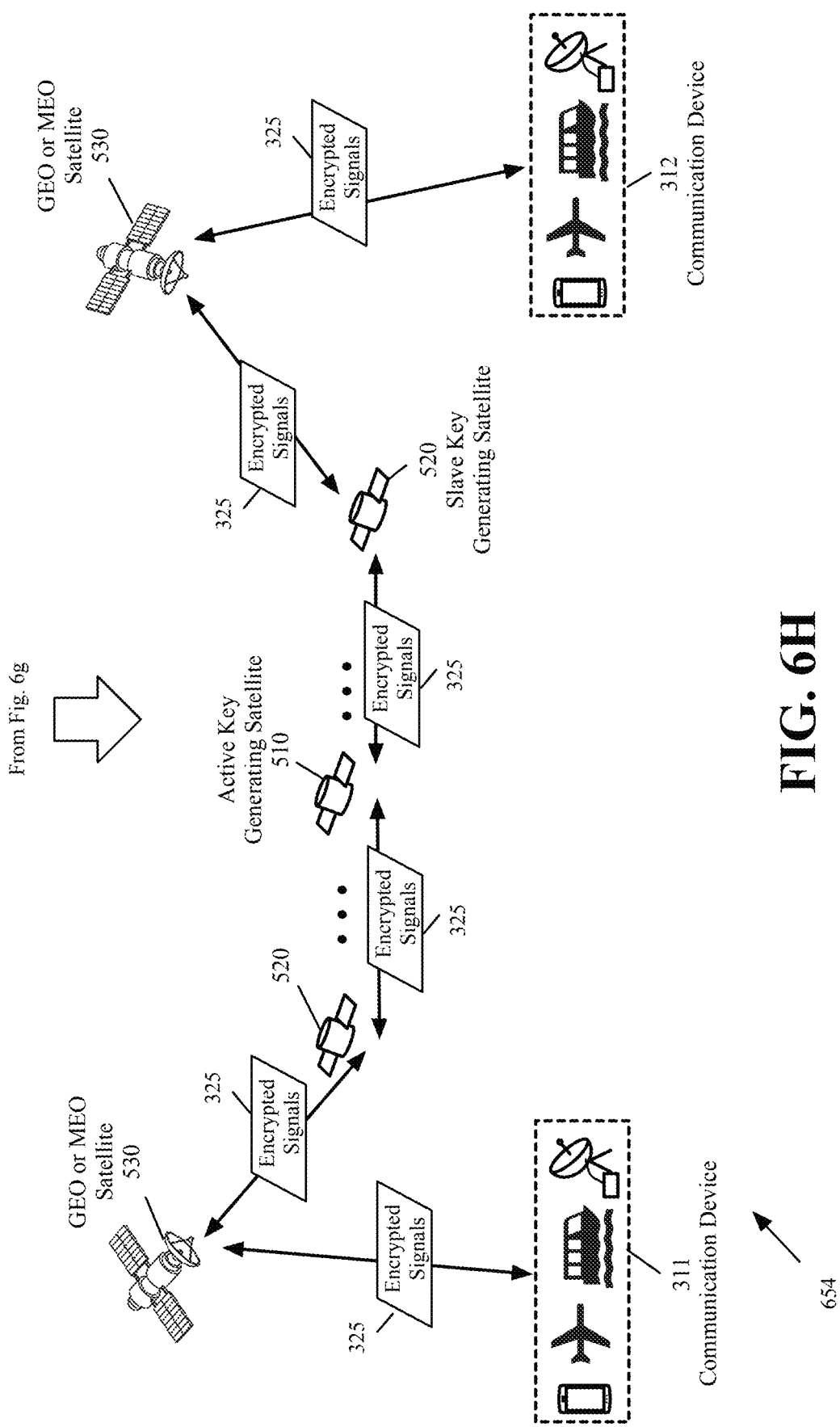
Figure 7B:
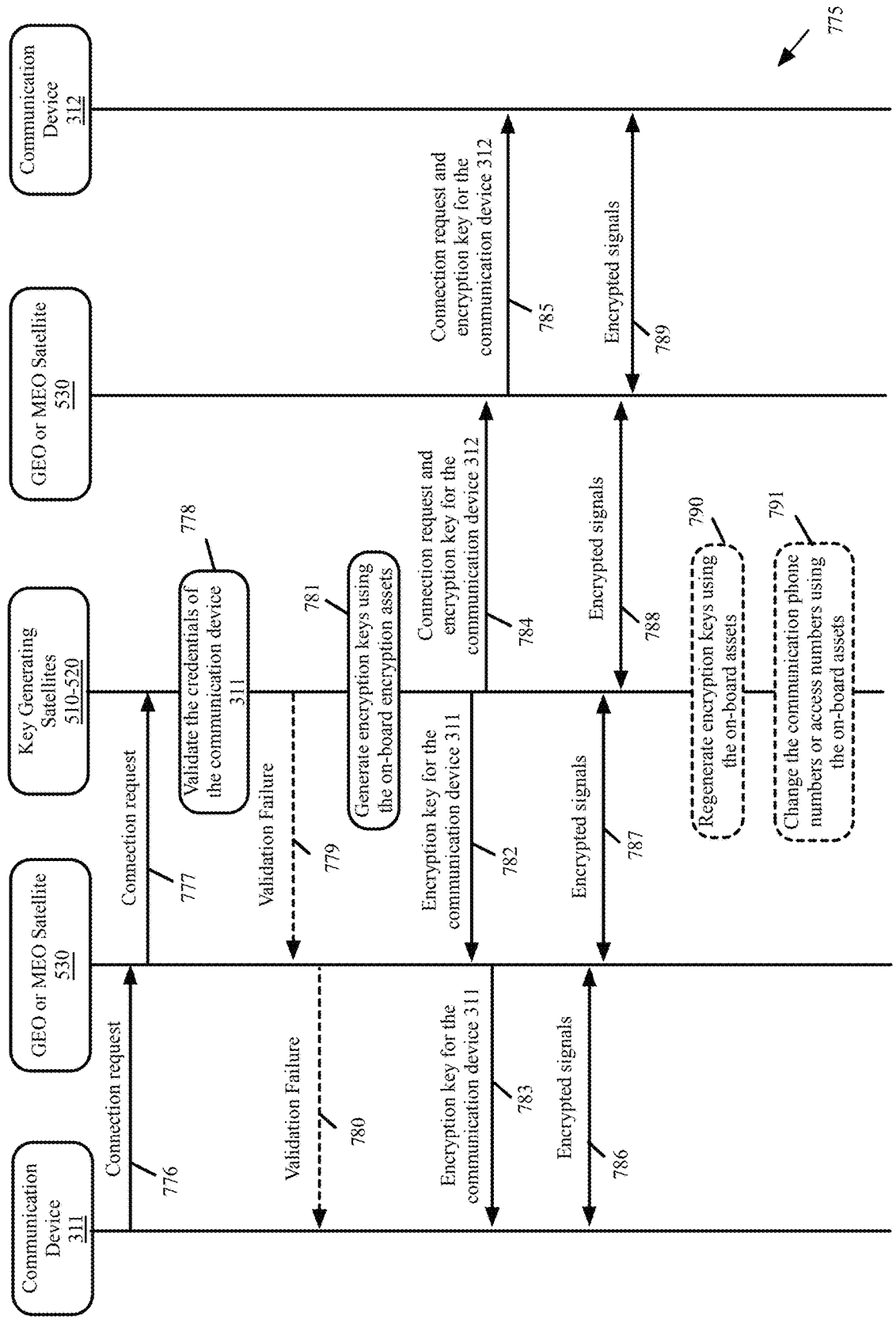
FIG. 7B is an example sequence diagram illustrating data items exchanged for establishing a communication link between the two communication devices of FIGS. 6E-6H, according to various aspects of the present disclosure.

FIG. 7B is an example sequence diagram 775 illustrating data items exchanged for establishing a communication link between the two communication devices 311 and 312 of FIGS. 6E-6H, according to various aspects of the present disclosure. With reference to FIG. 7B, the communication devices 311-312, the key generating satellites 510-520, and GEO or MEO Satellite 530 may be similar to the corresponding devices of FIGS. 6E-6H.

The communication device 311 may send (at step 776) a connection request to the communication device 312 to a GEO or MEO satellite 530. The connection request may include the identifications of the communication devices 311-312 and the identification of the key generating satellite 510. The connection request may be sent (at step 777) from the satellite 530 to the key generating satellite 510. If there is no direct satellite link between the satellite 530 and the key generating satellite 510, the request may be sent through one or more other key generating satellites 520 (e.g., as shown in FIG. 6E).

The key generating satellite 510 may validate (at block 778) the credentials of the communication device 311. In the banking example discussed above, the connection request may be a login request that may include a username and password. The key generating satellite 510 may validate that the username and password belongs to an account holder of the bank. As another example, the connection request may be a phone call and the key generating satellite 510 may validate that the phone call is initiated by a phone number that is recognized as a phone number of an account holder of the bank. As indicated above with reference to FIG. 2, the key generating satellite may validate the credentials of the communication device 311 using data stored in the computer readable media 220 of the key generating satellite 510.

When the validation fails, the key generating satellite 510 may optionally send (at steps 779-780) a validation failure message to the communication device 311 through a GEO or MEO satellite 530. If there is no direct satellite link between the satellite 530 and the key generating satellite 510, the validation failure message may be sent through one or more key generating satellites 520.

When the validation is successful, the key generating satellite 510 may generate (at block 781) encryption keys using the on-board encryption assets. The key generating satellite 510 may send (at steps 782-783) an encryption key to the communication device 311 through a GEO or MEO satellite 530. If there is no direct satellite link between the satellite 530 and the key generating satellite 510, the encryption key message may be sent through one or more key generating satellites 520.

The key generating satellite 510 may send (at steps 784-785) the connection request and an encryption key to the communication device 312 through a GEO or MEO satellite 530. If there is no direct satellite link between the satellite 530 and the key generating satellite 510, the connection request and encryption key message may be sent through one or more key generating satellites 520. The key generating satellite 510 may send the connection request and the encryption key to the communication device 312 in one or multiple messages. The communication devices 311 and 312 may then exchange encrypted signals (at steps 786-789) through one or more GEO or MEO satellites 530 and one or more key generating satellites 510-520. Upon completion of the final session, one of the communication devices may send (e.g., at the end of the signal exchange 786-789) an encrypted "end of session" signal to the key generating satellite and the other communication device and all connections and encryption keys may be dropped.

In some embodiments, the key generating satellite 510 may regenerate (at block 790) the encryption keys using the on-board assets and may send the regenerated encryption keys to the corresponding communication devices 311-312 through one or more satellites 510-530 (e.g., as shown in steps 782-785). In some embodiments, the key generating satellite 510 may change (at block 791) the communication phone numbers or satellite access numbers using the onboard assets and may send the changed communication phone numbers or satellite access numbers to the corresponding communication devices 311-312 through one or more satellites 510-530 (e.g., as shown in steps 782-785).

For example, in some embodiments, the key generating satellite 510 may regenerate the encryption keys and/or change the communication phone number or satellite access number. In some embodiments, the connection request 776 may include the request for key regeneration and/or changing the communication phone number or satellite access number. In other embodiments, the communication device 312 may periodically request the key generating satellite 510 to regenerate the encryption keys and/or to change the communication phone number or satellite access number. Yet, in other embodiments, the key generating satellite 510 may be configured to regenerate the encryption keys and/or to change the communication phone number or satellite access number after a certain time period.

Figure 8:
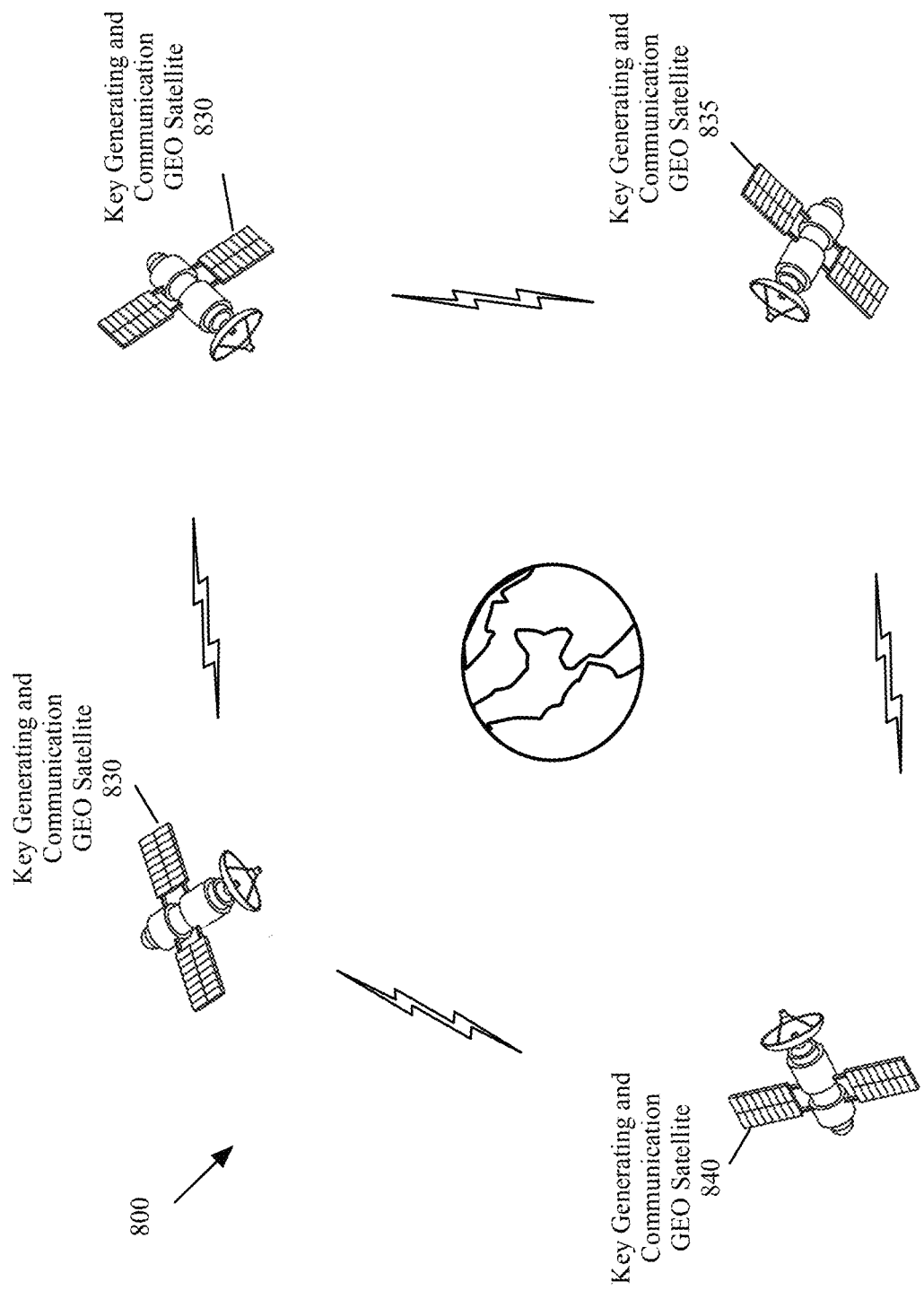
FIG. 8 is a functional diagram illustrating a communication system that includes a constellation of encryption key generating satellites, according to various aspects of the present disclosure.

FIG. 8 is a functional diagram illustrating a communication system 800 that includes a constellation of encryption key generating satellites, according to various aspects of the present disclosure. With reference to FIG. 8, the communication system 800 may include a constellation of satellites that may act as both encryption key generating satellites and relay satellites to carry the keys and data. The key generating satellites 830, in some embodiments, may be GEO satellites that are capable of communicating with each other using free space optical or radio frequency signals.

In some embodiments, such as the depicted embodiment, all key generating satellites 830 may be active and may generate encryption keys upon receiving a request from the communication device. In other embodiments, one of the key generating satellites 830 may be active at each time and may generate encryption keys. In these embodiments, the other key generating satellites may function as backup key generating satellites. In some embodiments, at least one backup key generating satellite may function as a hot standby and may take over the function of the active key generating satellite if the active key generating satellite suffers a failure or is taken offline. The key generating satellites 830 may communicate with each other using free space optical or radio frequency beams.

Figure 9A:
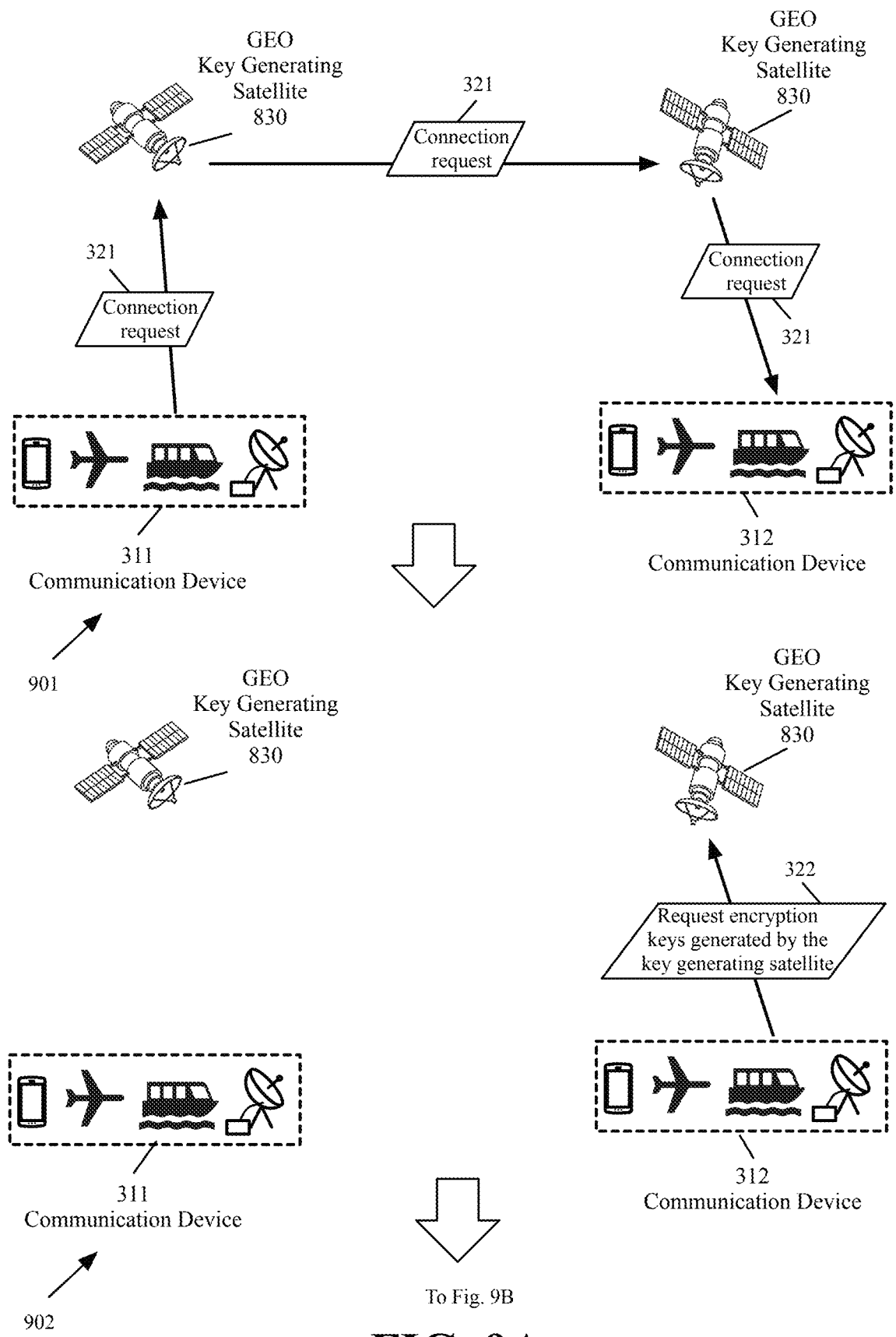
FIGS. 9A-9B are function diagrams illustrating a sequence of actions performed by the key generating satellite of FIG. 8 for generating encryption keys for a communication session between two communication devices, according to various aspects of the present disclosure.
Figure 9B:
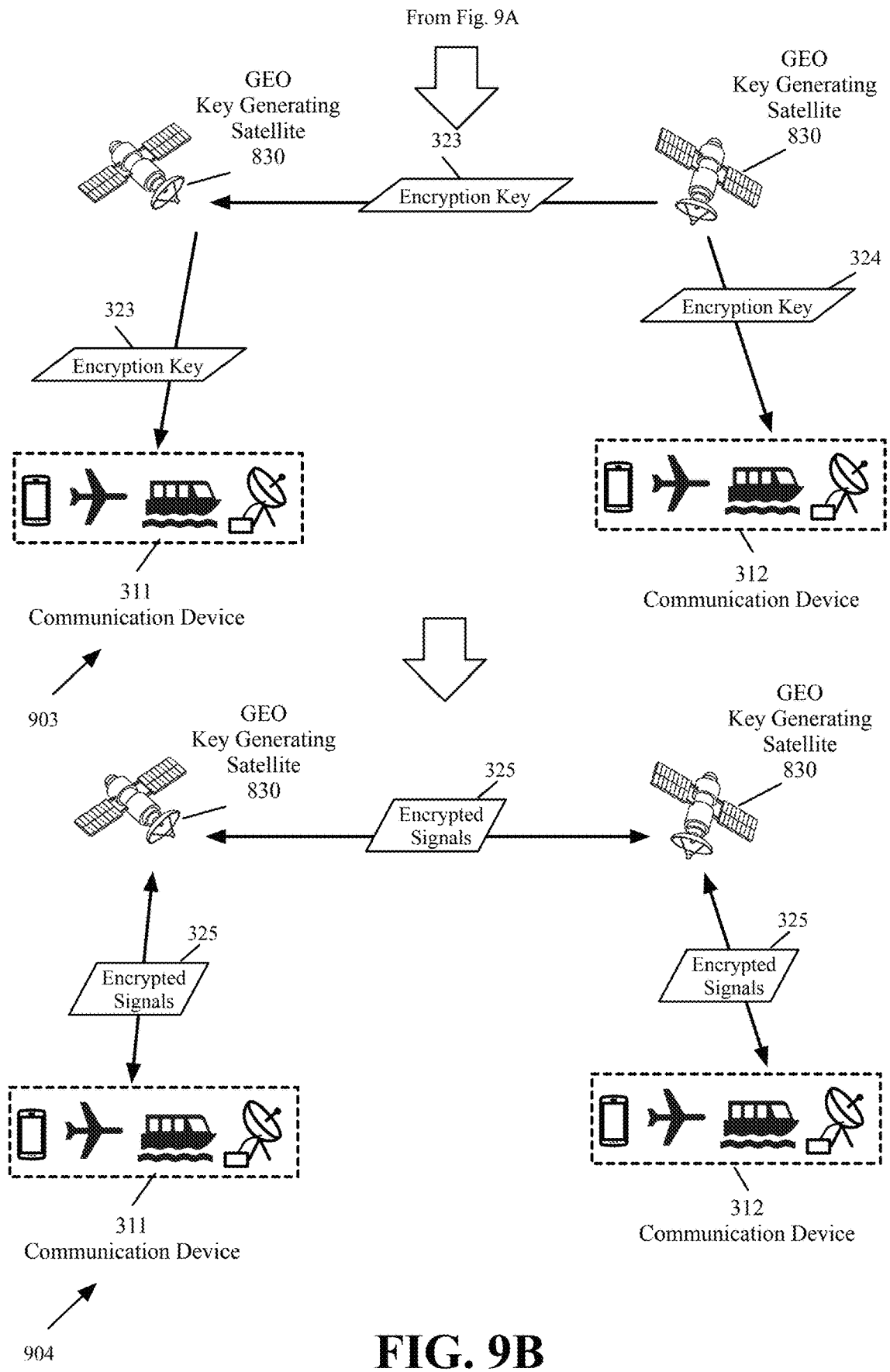

FIGS. 9A-9B are function diagrams illustrating a sequence of actions performed by the key generating satellite of FIG. 8 for generating encryption keys for a communication session between two communication devices, according to various aspects of the present disclosure. With reference to FIGS. 9A-9B, the communication devices 311 and 312 may be similar to the communication devices 311 and 312 of FIGS. 3A-3B.

FIGS. 9A-9B, as shown, include four operational stages 901-904. In stage 901, the communication device 311 may send a connection request 321 to the communication device 312. The connection request 321 may be sent from the communication device 311 to a key generating satellite 830 that covers the area where the communication device 311 is located. If the communication device 312 is also within the area that is accessible by the same key generating satellite 830, the key generating satellite 830 may directly send the connection request to the communication device 312. Otherwise, the key generating satellite 830 may send the connection request 321 to the communication device 312 through one or more key other key generating satellites 830. The other key generating satellite(s) 830 may then send the connection request 321 to the communication device 312.

As shown in stage 902, the communication device 312 may send a request 322 for encryption keys to the key generating satellite 830 that covers the area where the communication device 312 is located.

In stage 903, the key generating satellite 830 may generate a pair of encryption keys 323 and 324 using only the onboard hardware and software key generation assets. For example, and without limitations, the key generating satellite 830, in some embodiments, may include an encryption key generator 235 that generates encryption keys as described above with reference to FIG. 2.

As shown in stage 903, the key generating satellite 830 may send the encryption key 323 to the communication device 311 and the encryption key 324 to the communication device 312 through one or more key generating satellites 830 (e.g., if there is no direct link between the key generating satellite 830 and the communication device 311 and/or the communication device 312. In stage 904, the communication devices 311 and 312 may use their corresponding encryption keys 323 and 324 to exchange encrypted signals (e.g., voice and/or data) using one or more of the key generating satellites 830.

Figure 9C:
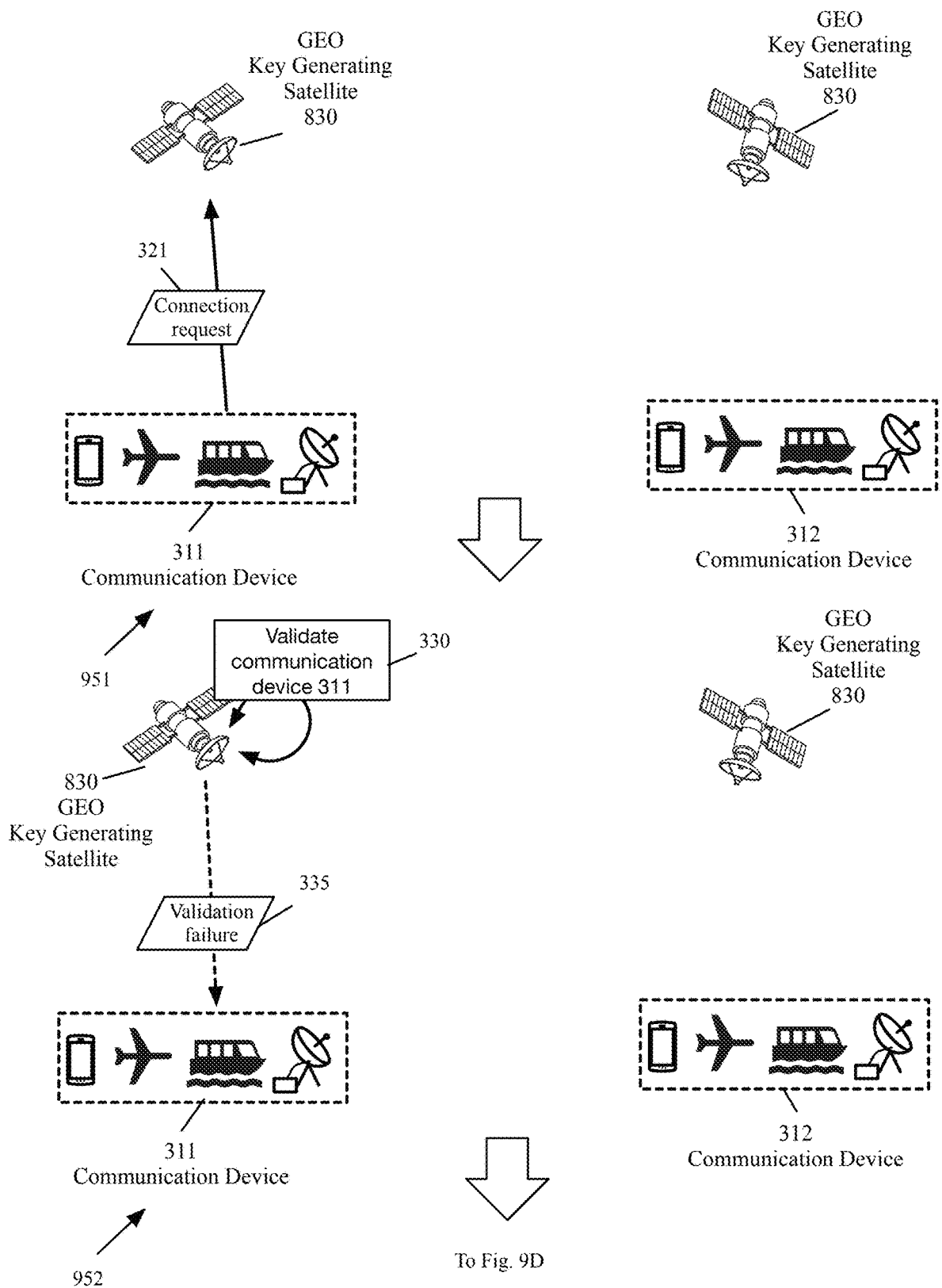
FIGS. 9C-9D are function diagrams illustrating an alternative sequence of actions performed by the key generating satellite of FIG. 8 for generating encryption keys for a communication session between two communication devices, according to various aspects of the present disclosure.
Figure 9D:
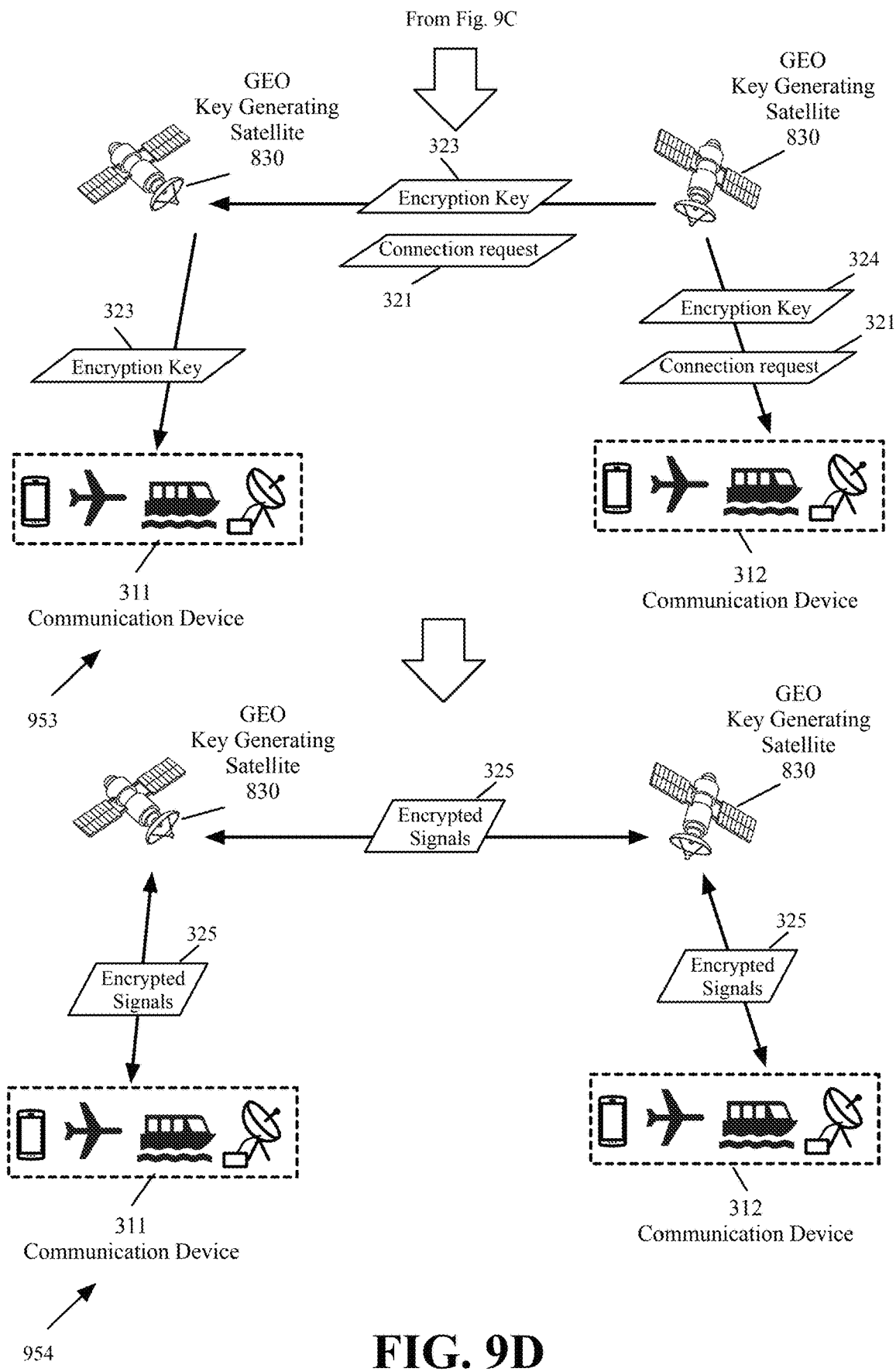

FIGS. 9C-9D are function diagrams illustrating an alternative sequence of actions performed by the key generating satellite of FIG. 8 for generating encryption keys for a communication session between two communication devices, according to various aspects of the present disclosure. With reference to FIGS. 9C-9D, the communication devices 311 and 312 may be similar to the communication devices 311 and 312 of FIGS. 3A-3B.

FIGS. 9C-9D, as shown, include four operational stages 951-954. In stage 951, the communication device 311 may send a connection request 321 to the communication device 312. The connection request 321 may be sent from the communication device 311 to a GEO communication satellite 830 that covers the area where the communication device 311 is located.

The connection request may include the identification of the communication device 311 and the communication device 312. For example, the connection request may be initiated through an App in the communication device 311, which may add the identification of the communication devices 311-312 to the connection request. Depending on the application, the App may also include other information, such as username and password, biometric information, account numbers, etc., that may be required to validate the credentials of communication device 311.

In the depicted embodiment, all GEO communication satellites 830 are active key generating satellites. In the embodiments that only one of the GEO communication satellites 830 is active, the GEO communication satellites 830 that receives the connection request may forward the connection request through direct satellite link to the active GEO communication satellites 830.

In stage 952, the active key generating satellite 830 may validate the credentials of the communication device 311, for example, as described above with reference to FIG. 2. When that the validation fails, the key generating satellite 830 may optionally send a validation failure message 335 to the communication device 311.

When the validation is successful, the key generating satellite 830, in stage 953, may generate a pair of encryption keys 323 and 324 using only the onboard hardware and software key generation assets of the key generating satellite. For example, and without limitations, the key generating satellite 830, in some embodiments, may include an encryption key generator 235 that generates encryption keys, as described above with reference to FIG. 2.

The key generating satellite 830 may send the encryption key 323 to the communication device 311. The key generating satellite 830 may send the encryption key 324 and the connection request 321 to the communication device 312. If the communication device 312 is not in a region that is covered by the key generating satellite 830, the key generating satellite 830 may send the encryption key 324 and the connection request 321 to the communication device 312 through one or more other key generating satellites 830.

In stage 954, the communication devices 311 and 312 may use their corresponding encryption keys 323 and 324 to exchange encrypted signals (e.g., voice and/or data) using one or more GEO satellites 830.

It should be noted that the communication between the communication devices 311-312 in stages 951-954 only goes through the direct link between the key generating satellites 830 without going through any ground infrastructure, which provides the technical advantage of avoiding the susceptibility of the ground infrastructure to signal jamming, spoofing, data interception, and cyberattacks.

Figure 10A:
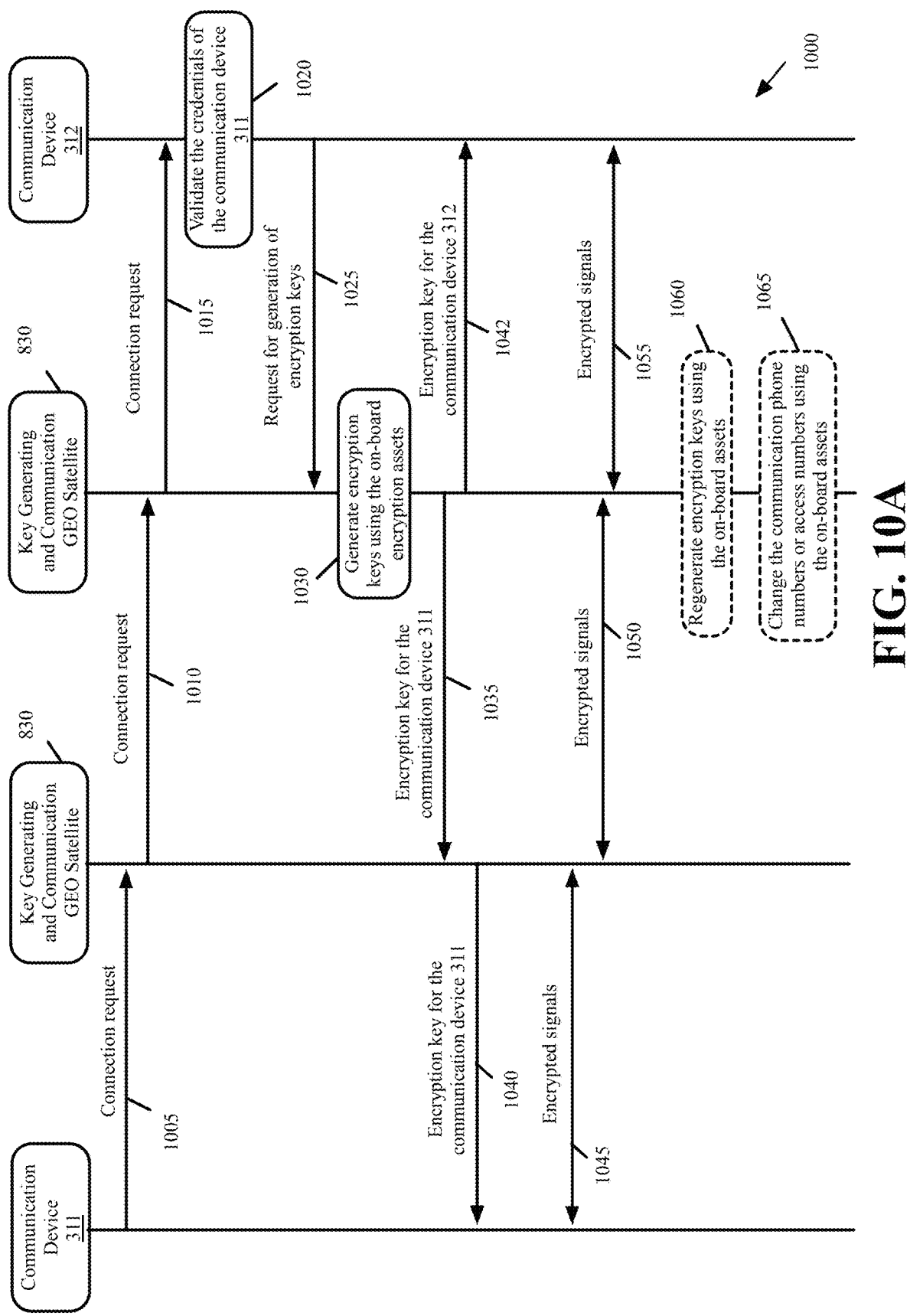
FIG. 10A is an example sequence diagram illustrating data items exchanged for establishing a communication link between the two communication devices of FIGS. 9A-9B, according to various aspects of the present disclosure.

FIG. 10A is an example sequence diagram 1000 illustrating data items exchanged for establishing a communication link between the two communication devices 311 and 312 of FIGS. 9A-9B, according to various aspects of the present disclosure. With reference to FIG. 10A, the communication devices 311-312 and the key generating satellites 830 may be similar to the corresponding devices of FIGS. 9A-9B.

The communication device 312 may send (at step 1005) a connection request to the communication device 312 to a key generating satellite 830. The connection request may be sent (at steps 1010-1015) to the communication device 312 through one or more key generating satellites 830. For example, the connection request may be sent to the communication device 312 as described above with reference to stage 901 of FIG. 9A.

The communication device 312 may validate (at block 1020) the credentials of the communication device 311. For example, the communication device 312 may validate the credentials of the communication device 311 as described above with reference to block 415 of FIG. 4. As indicated above with reference to FIG. 2, the key generating satellite, in some embodiments, may validate communication devices. In these embodiments, the validation of the communication device 311 may be performed by the key generating satellite 830.

After validating the credentials of the communication device 311, the communication device 312 may send a request (at step 1025) for encryption keys to the key generating satellite 830 that is covering the area where the communication device 312 is located. The key generating satellite 830 may generate (at block 1030) encryption keys using the on-board encryption assets. The key generating satellite 830 may send (at step 1035-1040) an encryption key to the communication device 311. If there is not direct link between the key generating satellite 830 and the communication device 311, the key generating satellite 830 may send the encryption key though one or more other key generating satellites 830 to the communication device 311, for example, as shown in stage 903 of FIG. 9B.

The key generating satellite 830 may send (at step 1042) an encryption key to the communication device 312. The communication devices 311 and 312 may then exchange encrypted signals (at steps 1045-1055) through one or more key generating satellites 830. Upon completion of the final session, one of the communication devices may send (e.g., at the end of the signal exchange 1045-1055) an encrypted "end of session" signal to the key generating satellite and the other communication device and all connections and encryption keys may be dropped.

In some embodiments, the key generating satellite 830 may regenerate (at block 1060) the encryption keys using the on-board assets. In some embodiments, the key generating satellite 830 may change (at block 1065) the communication phone numbers or satellite access numbers using the on-board assets. For example, the key generating satellite 830 may regenerate the encryption keys and/or to change the communication phone number or satellite access number as described above with reference to blocks 475 and 480) of FIG. 4.

Figure 10B:
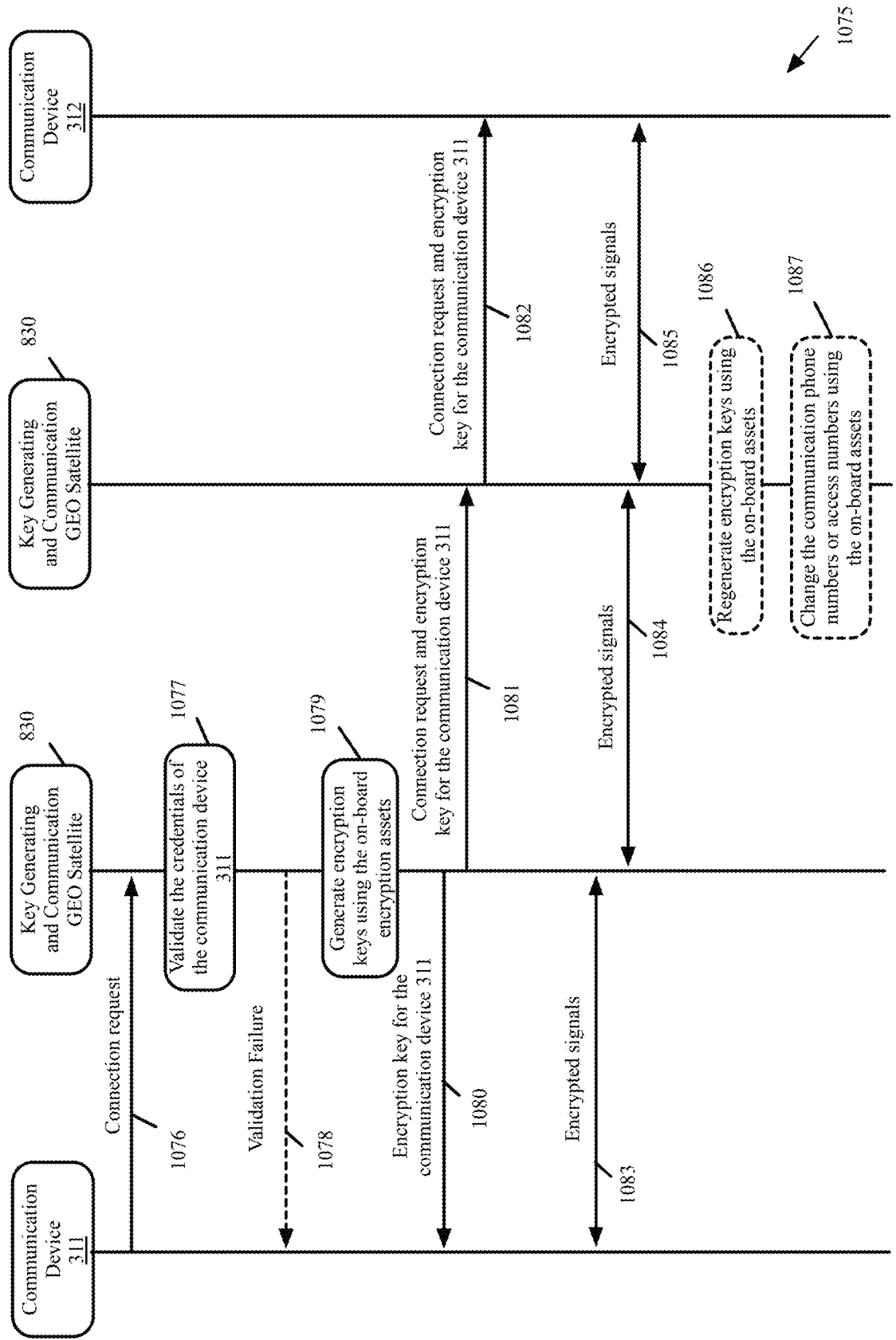
FIG. 10B is an example sequence diagram illustrating data items exchanged for establishing a communication link between the two communication devices of FIGS. 9C-9D, according to various aspects of the present disclosure.

FIG. 10B is an example sequence diagram 1075 illustrating data items exchanged for establishing a communication link between the two communication devices 311 and 312 of FIGS. 9C-9D, according to various aspects of the present disclosure. With reference to FIG. 10B, the communication devices 311-312 and the key generating satellites 830 may be similar to the corresponding devices of FIGS. 9C-9D.

The communication device 311 may send (at step 1076) a connection request to the communication device 312 to a key generating and communication GEO satellite 530. The connection request may include the identifications of the communication devices 311 and 312. The key generating and communication GEO satellite 830 may validate (at block 1077) the credentials of the communication device 311. In the banking example discussed above, the connection request may be a login request that may include a username and password. The key generating and communication GEO satellite 830 may validate that the username and password belongs to an account holder of the bank. As another example, the connection request may be a phone call and the key generating and communication GEO satellite 830 may validate that the phone call is initiated by a phone number that is recognized as a phone number of an account holder of the bank. As indicated above with reference to FIG. 2, the key generating and communication GEO satellite 830 may validate the credentials of the communication device 311 using data stored in the computer readable media 220 of the key generating and communication GEO satellite 830.

When the validation fails, the key generating and communication GEO satellite 830 may optionally send (at step 1078) a validation failure message to the communication device 311.

When the validation is successful, the key generating and communication GEO satellite 830 may generate (at block 1079) encryption keys using the on-board encryption assets.

The key generating and communication GEO satellite 830 may send (at step 1080) an encryption key to the communication device 311.

The key generating and communication GEO satellite 830 may send (at steps 1081-1082) the connection request and an encryption key to the communication device 312. If the communication device 312 is not in the coverage area of the key generating and communication GEO satellite 830, the connection request and encryption key message may be sent through one or more other key generating and communication GEO satellites 830 to the communication device 312. The key generating and communication GEO satellite 830 may send the connection request and the encryption key to the communication device 312 in one or multiple messages. The communication devices 311 and 312 may then exchange encrypted signals (at steps 1083-1085) through one or more key generating and communication GEO satellites 830. Upon completion of the final session, one of the communication devices may send (e.g., at the end of the signal exchange 1083-1085) an encrypted "end of session" signal to the key generating satellite and the other communication device and all connections and encryption keys may be dropped.

In some embodiments, the key generating and communication GEO satellite 830 may regenerate (at block 1086) the encryption keys using the on-board assets and may send the regenerated encryption keys to the corresponding communication devices 311-312 (e.g., as shown in steps 1080-1082). In some embodiments, the key generating and communication GEO satellite 830 may change (at block 1087) the communication phone numbers or satellite access numbers using the on-board assets and may send the changed communication phone numbers or satellite access numbers to the corresponding communication devices 311-312 (e.g., as shown in steps 1080-1082).

For example, in some embodiments, the key generating and communication GEO satellite may regenerate the encryption keys and/or change the communication phone number or satellite access number. In some embodiments, the connection request 1076 may include the request for key regeneration and/or changing the communication phone number or satellite access number. In other embodiments, the communication device 312 may periodically request the key generating and communication GEO satellite 830 to regenerate the encryption keys and/or to change the communication phone number or satellite access number. Yet, in other embodiments, the key generating and communication GEO satellite 830 may be configured to regenerate the encryption keys and/or to change the communication phone number or satellite access number after a certain time period.

Figure 11:
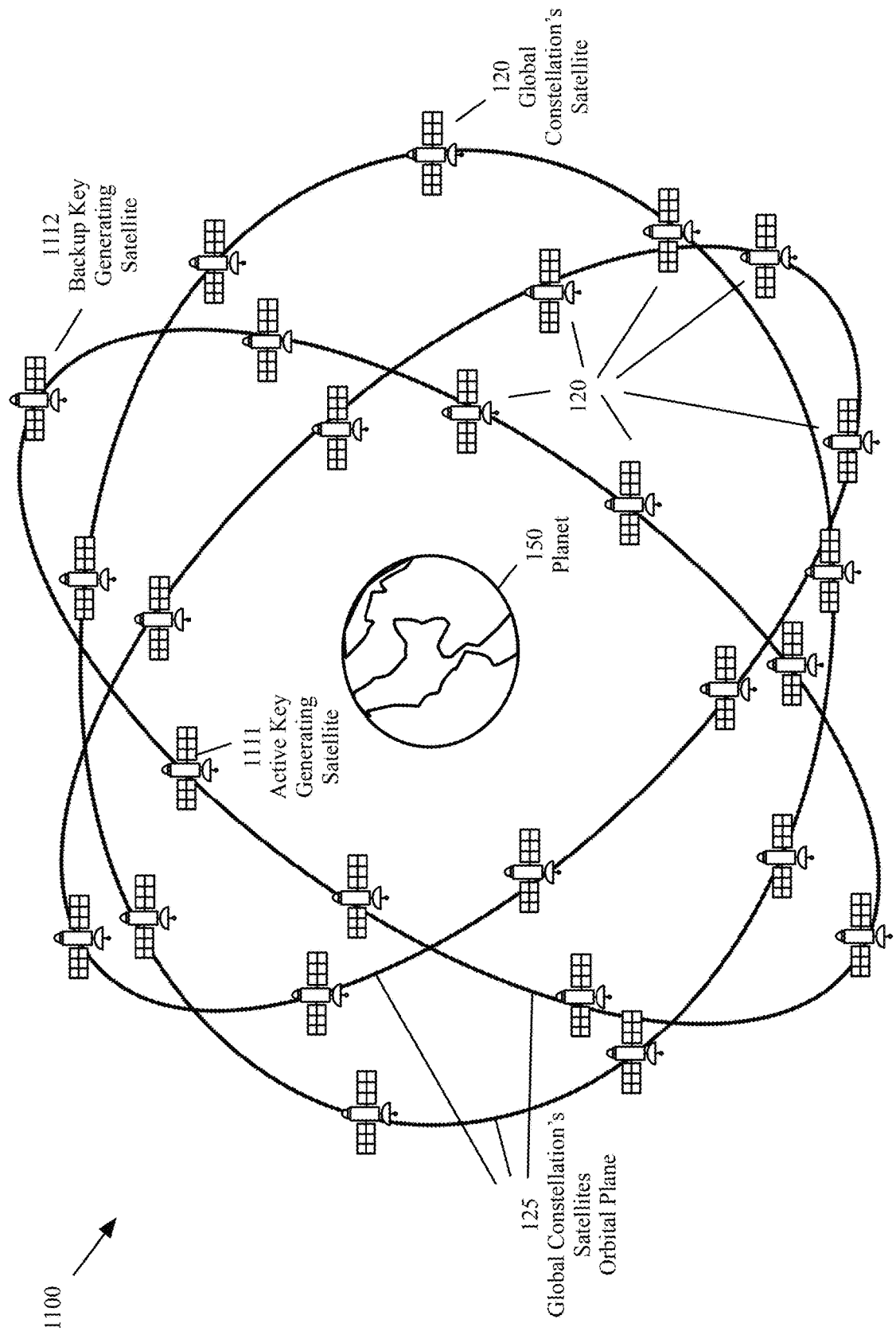
FIG. 11 is a functional diagram illustrating a communication system that includes a constellation of communicating satellites where at least one satellite of the constellation is an encryption key generating satellite, according to various aspects of the present disclosure.

FIG. 11 is a functional diagram illustrating a communication system 1100 that includes a constellation of communicating satellites where at least one satellite of the constellation is an encryption key generating satellite, according to various aspects of the present disclosure. With reference to FIG. 11, the constellation of satellites may include several satellites 120 and 1111-1112. One or more of the constellation's satellites, for example, the satellites 1111-1112 may be key generating satellites.

At least one key generating satellite, for example, the key generating satellite 1111, may be active at each time and may generate encryption keys. The other key generating satellite(s), for example, the key generating satellite 1112 may function as backup key generating satellite. In some embodiments, at least one backup key generating satellite may function as a hot standby and may take over the function of the active key generating satellite if the active key generating satellite suffers a failure or is taken offline.

A satellite constellation may be a group of satellites working together as a system and may provide global or near-global coverage. The global constellation's satellites 120 and 1111-1112 may be LEO or MEO satellites and may be placed in several complimentary orbital planes 125 around the planet 150. The satellites 120 and 1111-1112, in some embodiments, may communicate with ground stations and/or with each other using free space optical or radio frequency beams. The satellites 1111-1112, in some embodiments, may not communicate with ground stations during key generation and key distribution process and may only rely on on-board hardware and software key generation components.

Figure 12A:
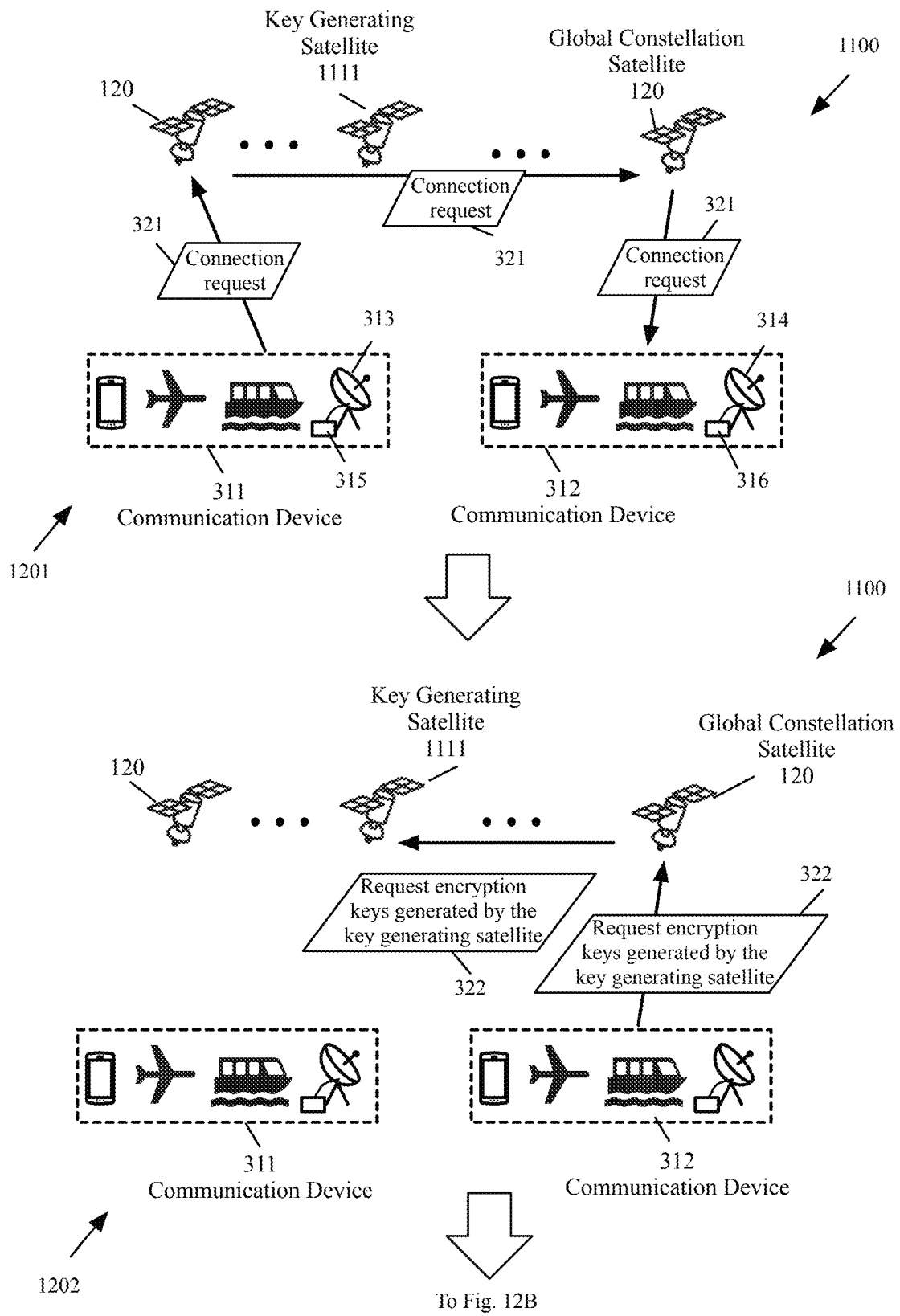
FIGS. 12A-12B are function diagrams illustrating a sequence of actions performed by the key generating satellite of FIG. 11 to generate encryption keys for a communication session between two communication devices, according to various aspects of the present disclosure.
Figure 12B:
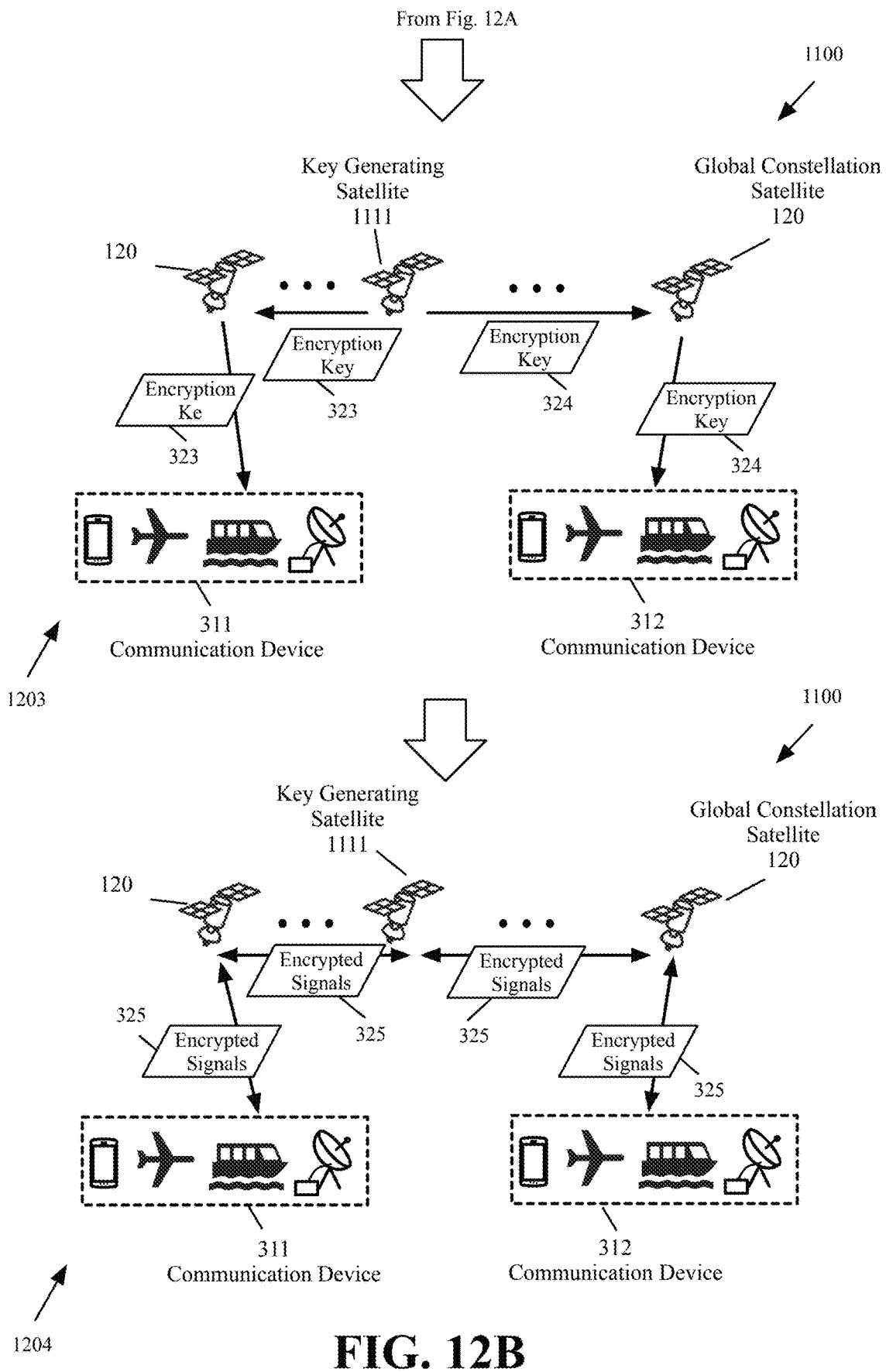

FIGS. 12A-12B are function diagrams illustrating a sequence of actions performed by the key generating satellite of FIG. 11 to generate encryption keys for a communication session between two communication devices, according to various aspects of the present disclosure. With reference to FIGS. 12A-12B, the communication devices 311 and 312 may be similar to the communication devices 311 and 312 of FIGS. 3A-3B.

FIGS. 12A-12B, as shown, include four operational stages 1201-1204. In stage 1201, the communication device 311 may send a connection request 321 to the communication device 312. The connection request 321 may be sent from the communication device 311 to a communication satellite 120 that is passing over the area where the communication device 311 is located. If the communication device 312 is also within the area that is accessible by the same satellite 120, the satellite 120 may directly send the connection request to the communication device 312. Otherwise, the satellite 120 may send the connection request 321 to the communication device 312 through one or more other satellites 120 of the satellite constellation, which may include the key generating satellite 1111 if the key generating satellite 1111 is one of the constellation's satellites that is on the path between the communication devices 311 and 312.

In stage 1202, the communication device 312 may validate the connection request from the communication device 311. For example, the communication device 312 may validate the connection request, as described above with reference to FIGS. 3A-3B. As indicated above with reference to FIG. 2, the key generating satellite, in some embodiments, may validate communication devices. In these embodiments, the validation of the communication device 311 may be performed by the key generating satellite 1110.

As shown in stage 1202, the communication device 312 may send a request 322 for encryption keys by the key generating satellite 1111. The request 322 may be picked up by a satellite 120 of satellite the constellation that is above the area where the communication device 312 is located. Depending on whether the satellite 120 has a direct link to the key generation satellite 1111, the satellite 120 may send the request 322 either directly, or through one or more other satellites 120 of the satellite constellation, to the key generating satellite 1111. The request may include the identification of the communication devices 311 and 312.

In stage 1203, the key generating satellite 1111 may generate a pair of encryption keys 323 and 324 using only the onboard hardware and software key generation assets. For example, and without limitations, the key generating satellite 1111, in some embodiments, may include an encryption key generator 235 that generates encryption keys, as described above with reference to FIG. 2.

As shown in stage 1203, the key generating satellite 1111 may send the encryption key 323 to the communication device 311 and the encryption key 324 to the communication device 312 through one or more other satellites 120 of the satellite constellation. In stage 1204, the communication devices 311 and 312 may use their corresponding encryption keys 323 and 324 to exchange encrypted signals (e.g., voice and/or data) using one or more satellites 120 of the satellite constellation.

Figure 12C:
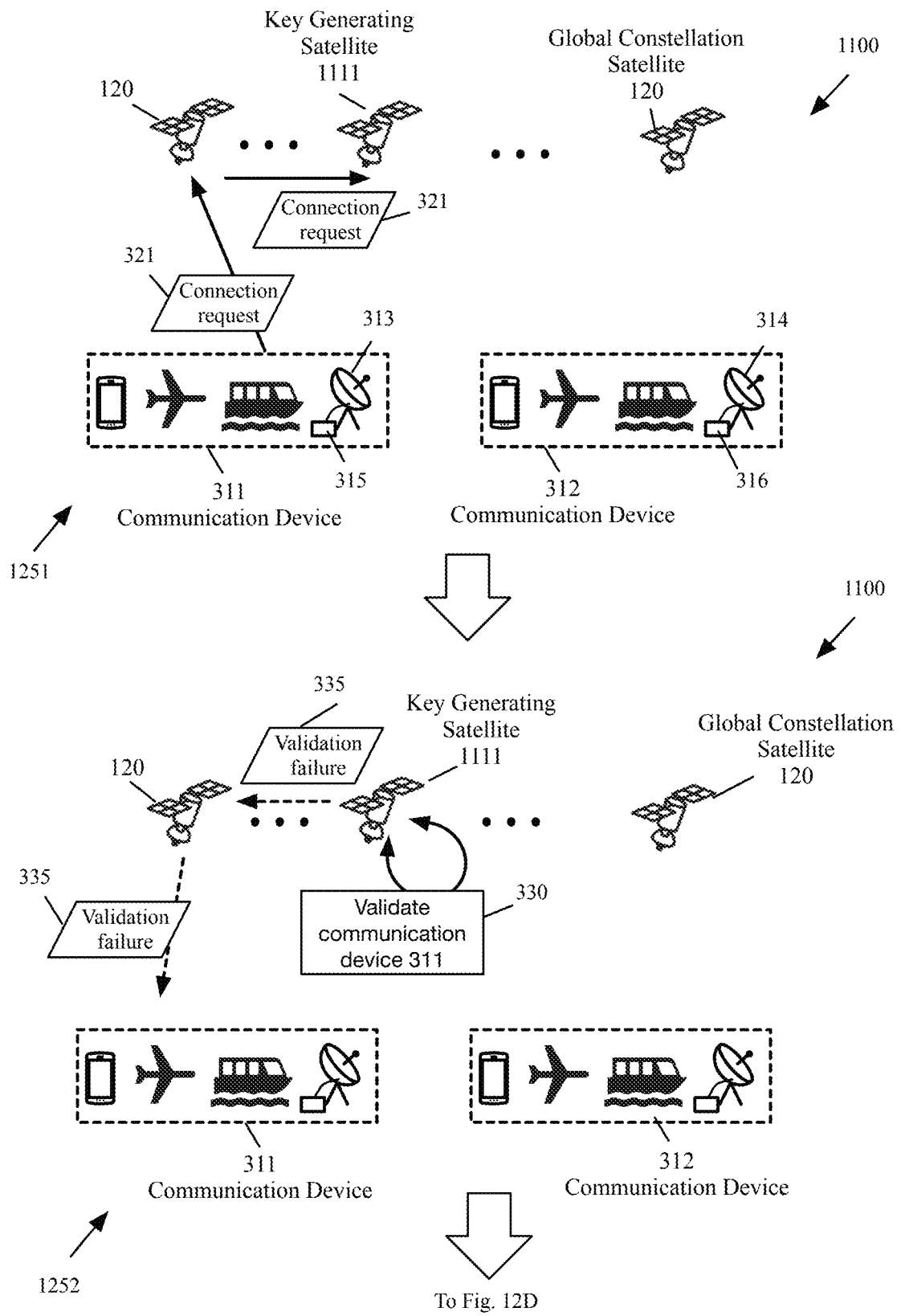
FIGS. 12C-12D are function diagrams illustrating an alternative sequence of actions performed by the key generating satellite of FIG. 11 to generate encryption keys for a communication session between two communication devices, according to various aspects of the present disclosure.
Figure 12D:
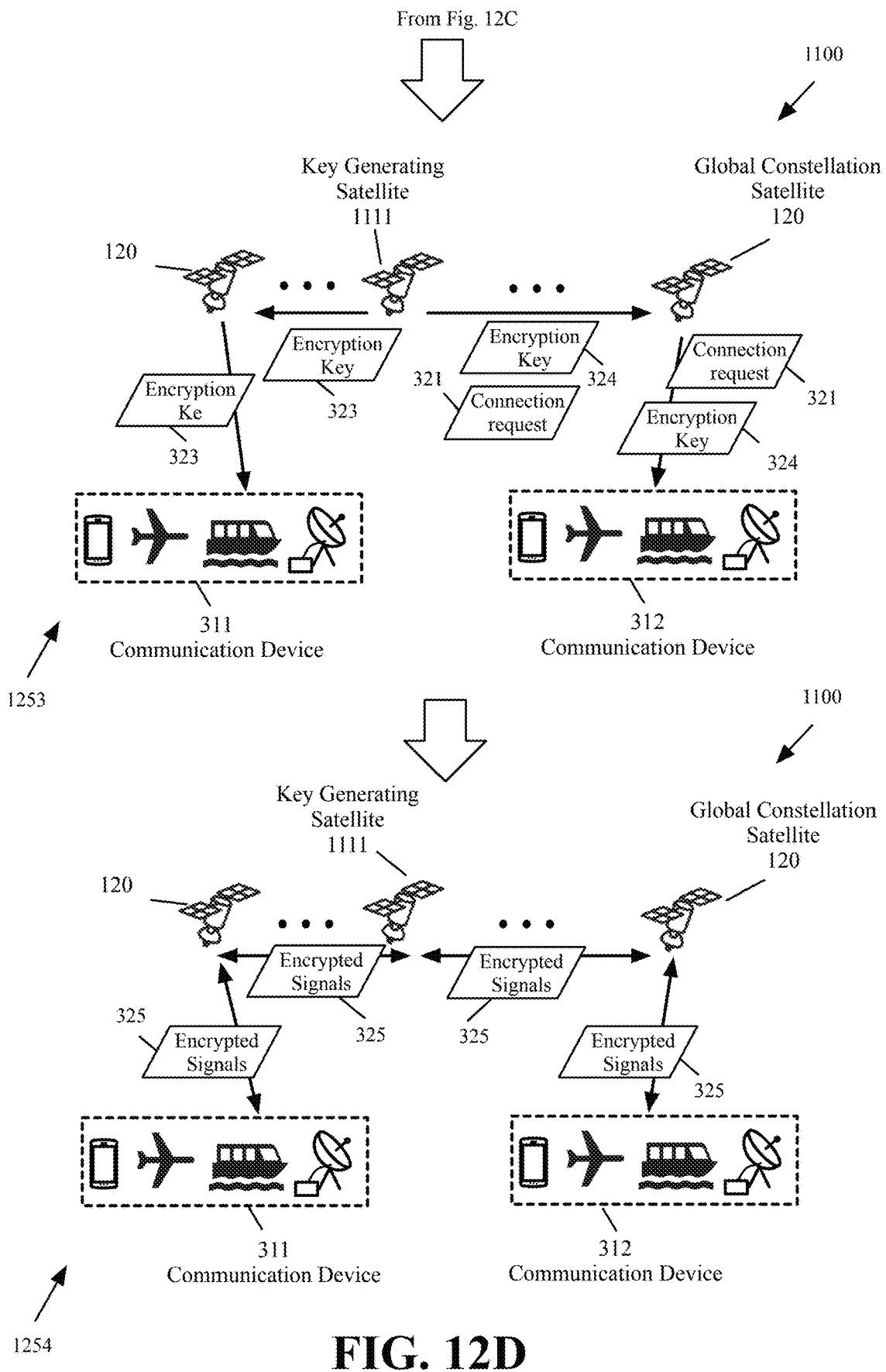

FIGS. 12C-12D are function diagrams illustrating an alternative sequence of actions performed by the key generating satellite of FIG. 11 to generate encryption keys for a communication session between two communication devices, according to various aspects of the present disclosure. With reference to FIGS. 12C-12D, the communication devices 311 and 312 may be similar to the communication devices 311 and 312 of FIGS. 3A-3B.

FIGS. 12C-12D, as shown, include four operational stages 1251-1254. In stage 1251, the communication device 311 may send a connection request 321 to the communication device 312. In the depicted embodiment, there is only one active key generating satellite 111 in the global constellation of satellites. In some other embodiments, all satellites in the LEO or MEO constellation may act as active key generating satellites. In such embodiments, the communication between communication devices 311-312 may be similar as what described above with reference to FIGS. 9C-9D and 10B, except that the satellites in the satellite constellation may be LEO or MEO satellites instead of GEO satellites.

In the embodiments that there is only one key generating satellite 1111, the connection request may be sent to the key generating satellite 1111 through one or more global constellation satellites 120 if the communication device is not located in an area that is covered by the key generating satellite 1111.

The connection request may include the identification of the communication devices 311-312, and the identification of the key generating satellite 1111. For example, the connection request may be initiated through an App in the communication device 311, which may add the identification of the communication devices 311-312, and the identification of the key generating satellite 1111 to the connection request. Depending on the application, the App may also include other information, such as username and password, biometric information, account numbers, etc., that may be required to validate the credentials of communication device 311.

In stage 1252, the active key generating satellite 1111 may validate the credentials of the communication device 311, for example, as described above with reference to FIG. 2. When that the validation fails, the key generating satellite 1111 may optionally send a validation failure message 335 to the communication device 311.

When the validation is successful, the key generating satellite 111, in stage 1253, may generate a pair of encryption keys 323 and 324 using only the onboard hardware and software key generation assets of the key generating satellite. For example, and without limitations, the key generating satellite 1111, in some embodiments, may include an encryption key generator 235 that generates encryption keys, as described above with reference to FIG. 2.

The key generating satellite 1111 may send the encryption key 323 to the communication device 311. The key generating satellite 1111 may send the encryption key 324 and the connection request 321 to the communication device 312. If the communication devices 311 and/or 312 are not in a region that is covered by the key generating satellite 1111, the key generating satellite 1111 may send the encryption keys and/or the connection request to the communication devices 311-312 through one or more other satellites 120.

In stage 1254, the communication devices 311 and 312 may use their corresponding encryption keys 323 and 324 to exchange encrypted signals (e.g., voice and/or data) using one or more satellites 120 or 1111.

It should be noted that the communication between the communication devices 311-312 in stages 1251-1254 only goes through the direct link between the key generating satellite 1111 and satellites 120 without going through any ground infrastructure, which provides the technical advantage of avoiding the susceptibility of the ground infrastructure to signal jamming, spoofing, data interception, and cyberattacks.

Figure 13A:
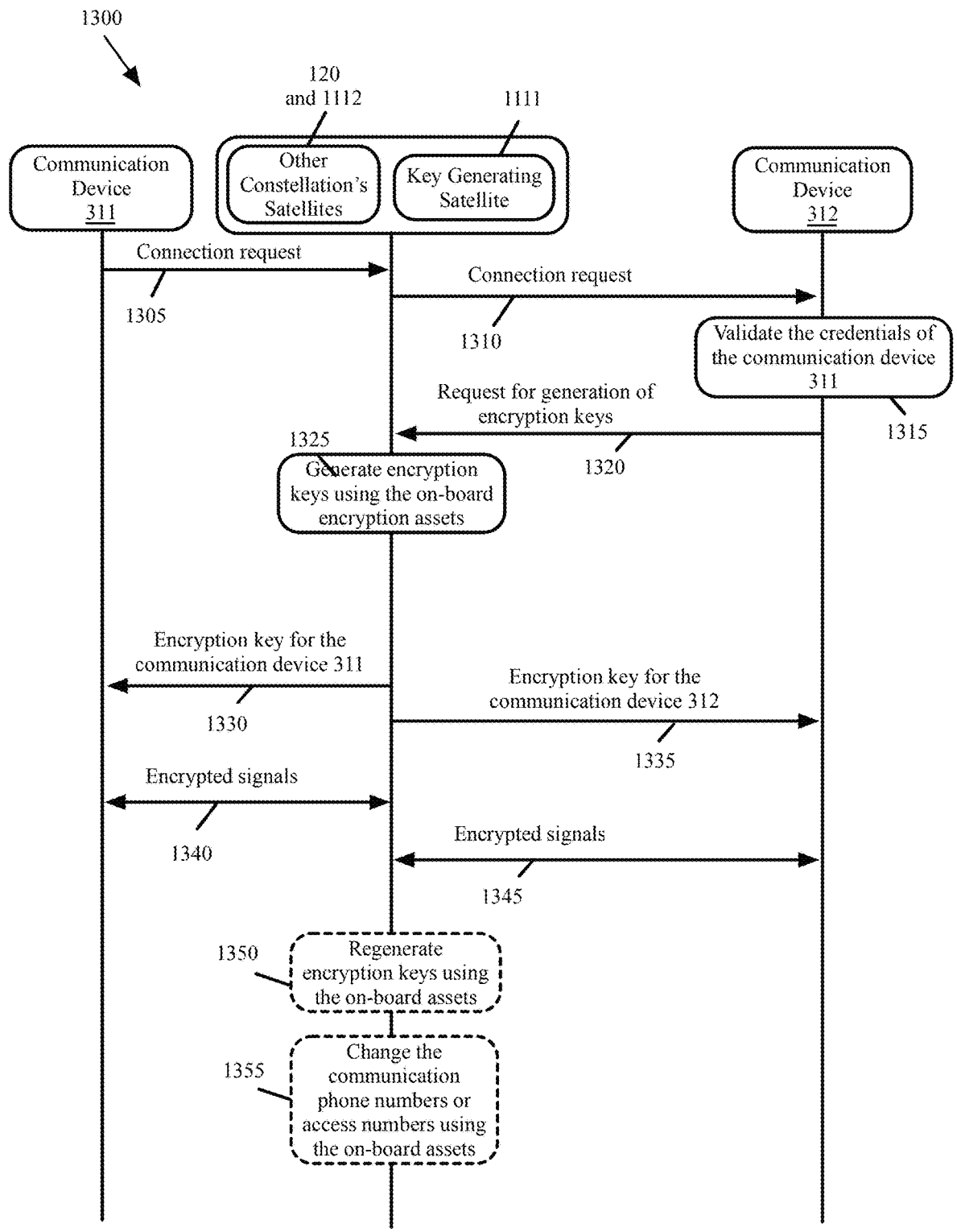
FIG. 13A is an example sequence diagram illustrating data items exchanged for establishing a communication link between the two communication devices of FIGS. 12A-12B, according to various aspects of the present disclosure.

FIG. 13A is an example sequence diagram 1300 illustrating data items exchanged for establishing a communication link between the two communication devices 311 and 312 of FIGS. 12A-12B, according to various aspects of the present disclosure. With reference to FIG. 13A, the communication devices 311-312, the key generating satellite 1111, and the other global constellation's satellites 120 and 1112 may be similar to the corresponding devices of FIGS. 12A-12B.

The communication device 312 may send (at step 1305) a request to connect to the communication device 312 to a satellite 120 of the satellite constellation. The connection request may be sent (at step 1310) to the communication device 312 through one or more satellites 120 of the satellite constellation. For example, the connection request may be sent to the communication device 312 as described above with reference to stage 1201 of FIG. 12A.

The communication device 312 may validate (at block 1315) the credentials of the communication device 311. After validating the credentials of the communication device 311, the communication device 312 may send a request (at step 1320) for generation of encryption keys to the key generating satellite 1111 through one or more other global constellation satellites 120 and 1112.

The key generating satellite 1111 may generate (at block 1325) encryption keys using the on-board encryption assets. The key generating satellite 1111 may send (at step 1330) an encryption key to the communication device 311 through one or more of the other global constellation satellites 120 and 1112. The key generating satellite 1111 may send (at step 1335) an encryption key to the communication device 312 through one or more of the other global constellation satellites 120 and 1112. The communication devices 311 and 312 may then exchange encrypted signals (at steps 1340-1345) through one or more global constellation satellites 120. Upon completion of the final session, one of the communication devices may send (e.g., at the end of the signal exchange 1340-1345) an encrypted "end of session" signal to the key generating satellite and the other communication device and all connections and encryption keys may be dropped.

In some embodiments, the key generating satellite 1111 may regenerate (at block 1350) the encryption keys using the on-board assets. In some embodiments, the key generating satellite 1111 may change (at block 1355) the communication phone numbers or satellite access numbers using the on-board assets.

For example, in some embodiments, the communication device 312 may request the key generating satellite 1111 to regenerate the encryption keys and/or to change the communication phone number or satellite access number. In some embodiments, the communication device 312 may include the request for key regeneration and/or to changing the communication phone number or satellite access number in the initial request for generation of encryption keys. In other embodiments, the communication device 312 may periodically request the key generating satellite 1111 to regenerate the encryption keys and/or to change the communication phone number or satellite access number. Yet, in other embodiments, the key generating satellite 1111 may be configured to regenerate the encryption keys and/or to change the communication phone number or satellite access number after a certain time period.

Figure 13B:
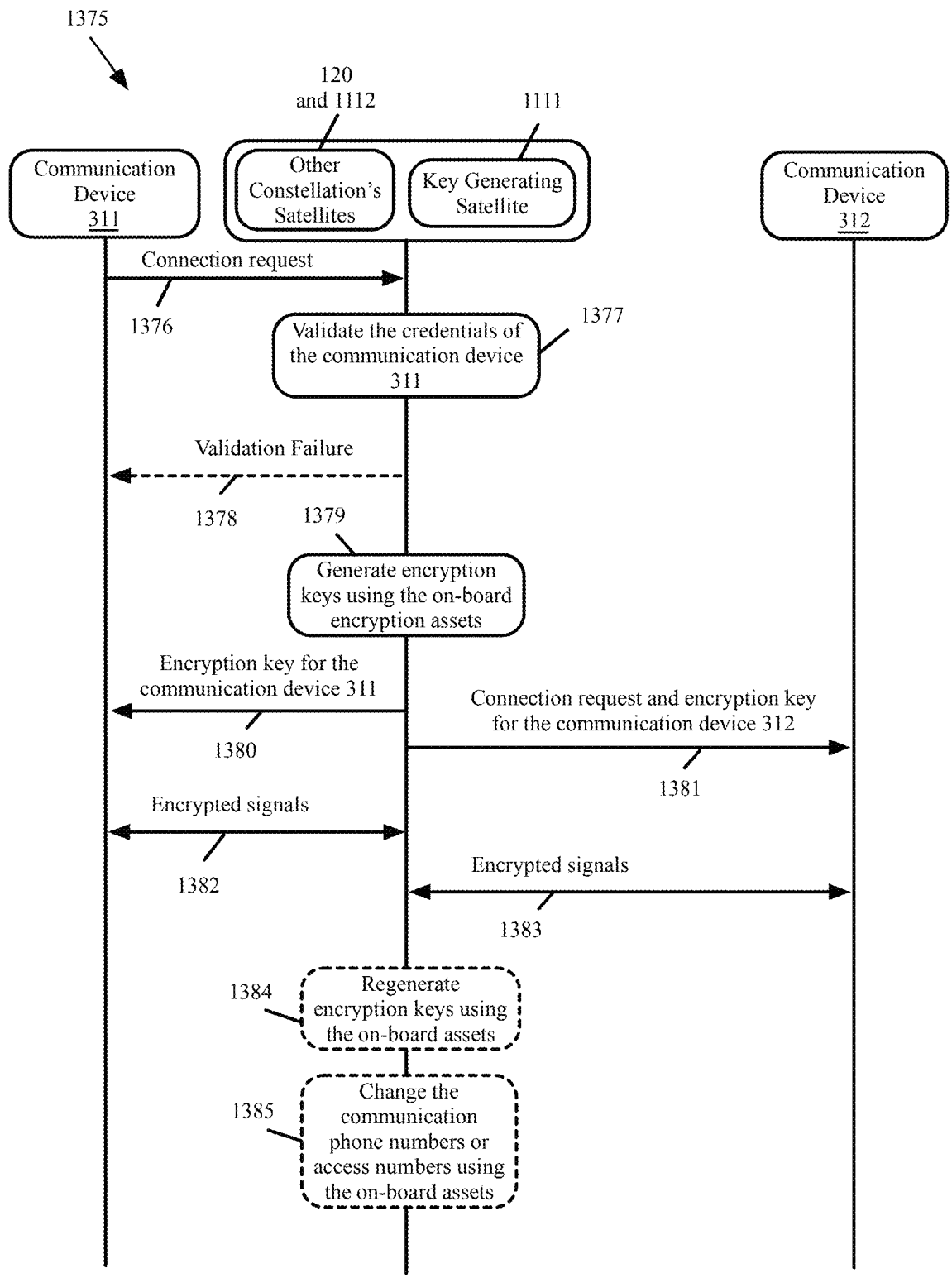
FIG. 13B is an example sequence diagram illustrating data items exchanged for establishing a communication link between the two communication devices of FIGS. 12C-12D, according to various aspects of the present disclosure.

FIG. 13B is an example sequence diagram 1375 illustrating data items exchanged for establishing a communication link between the two communication devices 311 and 312 of FIGS. 12C-12D, according to various aspects of the present disclosure. With reference to FIG. 13B, the communication devices 311-312, the key generating satellite 1111, and the other global constellation's satellites 120 and 1112 may be similar to the corresponding devices of FIGS. 12V-12D.

The communication device 312 may send (at step 1376) a request to connect to the communication device 312 to a satellite 120 or 1111-1112 of the satellite constellation. The key generating satellite 1111 may receive the connection request either directly (if the area where the communication device 311 is covered by the key generating satellite 1111) or through one or more other satellites 120 or 1112.

The key generating satellite 1111 may validate (at block 1377) the credentials of the communication device 311. In the banking example discussed above, the connection request may be a login request that may include a username and password. The key generating satellite 1111 may validate that the username and password belongs to an account holder of the bank. As another example, the connection request may be a phone call and the key generating satellite 1111 may validate that the phone call is initiated by a phone number that is recognized as a phone number of an account holder of the bank. As indicated above with reference to FIG. 2, the key generating satellite 111 may validate the credentials of the communication device 311 using data stored in the computer readable media 220 of the key generating satellite 1111.

When the validation fails, the key generating satellite 111 may optionally send (at step 1378) a validation failure message to the communication device 311. When the validation is successful, the key generating satellite 1111 may generate (at block 1379) encryption keys using the on-board encryption assets. The key generating satellite 1111 may send (at step 1380) an encryption key to the communication device 311. If the communication device 311 is not in the coverage area of the key generating satellite 111, the connection request and encryption key message may be sent through one or more satellites 120 or 1112 to the communication device 311.

The key generating satellite 1111 may send (at step 1381) the connection request and an encryption key to the communication device 312. If the communication device 312 is not in the coverage area of the key generating satellite 111, the connection request and encryption key message may be sent through one or more satellites 120 or 1112 to the communication device 312. The key generating satellite 1111 may send the connection request and the encryption key to the communication device 312 in one or multiple messages. The communication devices 311 and 312 may then exchange encrypted signals (at steps 1382-1383) through one or more satellites 120 or 1111-1112. Upon completion of the final session, one of the communication devices may send (e.g., at the end of the signal exchange 1382-1383) an encrypted "end of session" signal to the key generating satellite and the other communication device and all connections and encryption keys may be dropped.

In some embodiments, the key satellite 1111 may regenerate (at block 1384) the encryption keys using the on-board assets and may send the regenerated encryption keys to the corresponding communication devices 311-312 (e.g., as shown in steps 1380-1381). In some embodiments, the key generating satellite 1111 may change (at block 11385) the communication phone numbers or satellite access numbers using the on-board assets and may send the changed communication phone numbers or satellite access numbers to the corresponding communication devices 311-312 (e.g., as shown in steps 1380-1381).

For example, in some embodiments, the key generating satellite may regenerate the encryption keys and/or change the communication phone number or satellite access number. In some embodiments, the connection request 1376 may include the request for key regeneration and/or changing the communication phone number or satellite access number. In other embodiments, the communication device 312 may periodically request the key generating satellite 1111 to regenerate the encryption keys and/or to change the communication phone number or satellite access number. Yet, in other embodiments, the key generating satellite 1111 may be configured to regenerate the encryption keys and/or to change the communication phone number or satellite access number after a certain time period.

Figure 14:
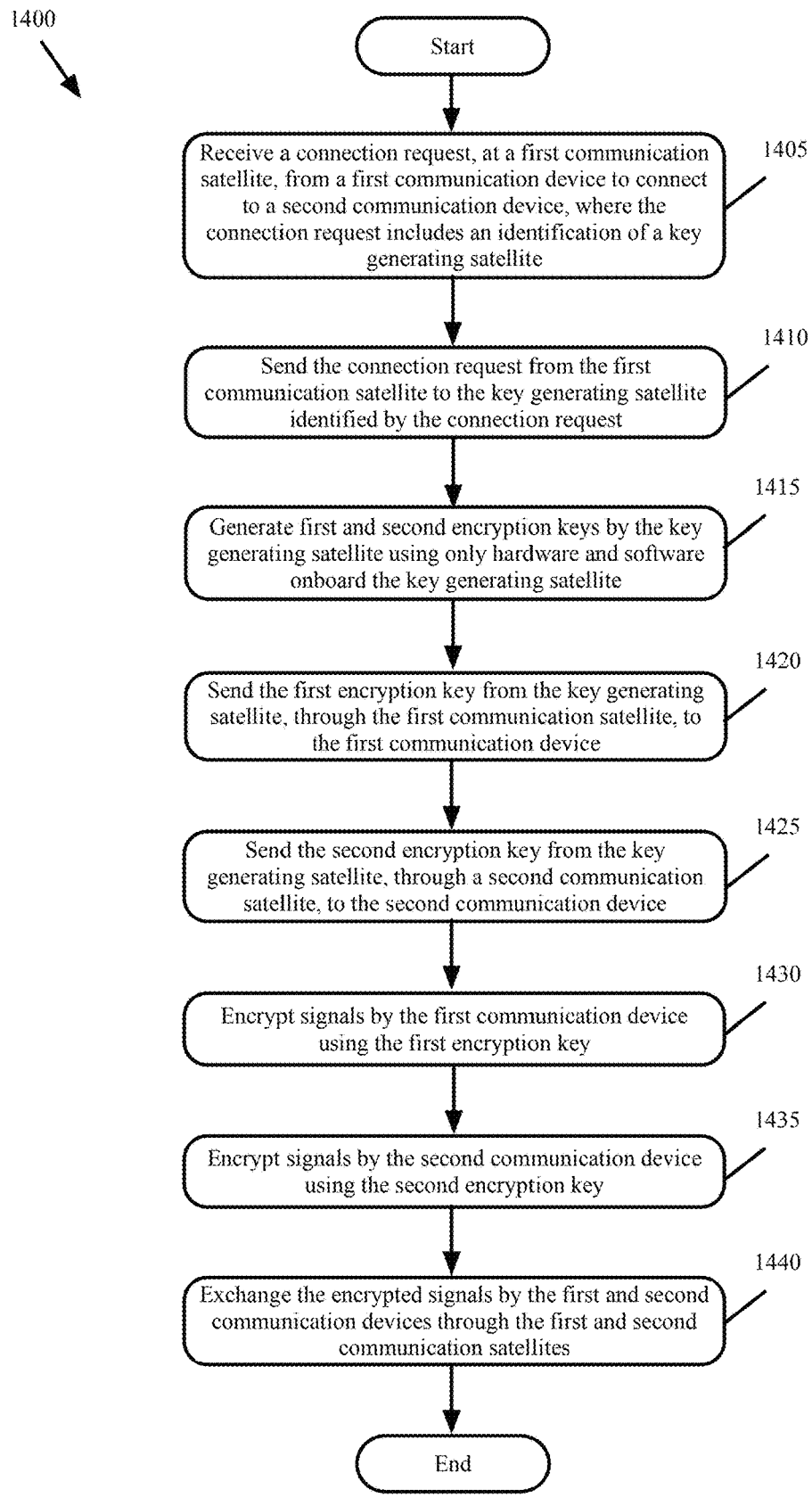
FIG. 14 is a flowchart illustrating an example process for secure satellite communication, according to various aspects of the present disclosure.

FIG. 14 is a flowchart illustrating an example process 1400 for secure satellite communication, according to various aspects of the present disclosure. The process 1400 may receive (at block 1405) a connection request, at a first communication satellite, from a first communication device to connect to a second communication device. The connection request may include an identification of a key generating satellite. For example, a communication satellite may receive a connection request 321 from a communication device 311 as described above with reference to FIGS. 3A, 3C, 6A, 6E, 9A, 9C, 12A, and 12C. The identification of the key generating satellite may include, for example, a network address of the key generating satellite.

The process 1400 may send (at block 1410) the connection request from the first communication satellite to the key generating satellite identified by the connection request. For example, the connection request 321 may be sent to the key generating satellite as described above with reference to FIGS. 3C, 6E, 9C, and 12C.

In some embodiments, the first communication device may include a first hardware encryption unit, the second communication device may include a second hardware encryption unit, and the key generating satellite may include a third hardware encryption unit. Each of the first, second, and third hardware encryption units may be configured to decrypt signals encrypted by the others of the first, second, and third hardware encryption units. In these embodiments, the process 1400 may encrypt at least a portion of the connection request by the first communication device using the first hardware encryption unit, and may decrypt the encrypted portion of the connection request by the key generating satellite using the third hardware encryption unit. For example, the header portion of the connection request may not be encrypted by the hardware encryption unit of the first communication device to allow the first communicate satellite to determine where to forward the connection request. The other portion of the connection may be encrypted by the hardware encryption unit of the first communicate satellite and may be decrypted by the hardware encryption unit of the second communication device or by the hardware encryption unit of the key generating satellite.

The connection request, in some embodiments may include one or more identifications associated with a user of the first communication device. The identifications associated with the user of the first communication device may include, for example, one or more of a username, a password, a telephone number, or a set of biometric information. In these embodiments, the process 1400 may validate the first communication device when the one or more identifications associated with the user of the first communication device match one or more credentials stored in a storage device of the key generating satellite.

The credentials stored in the storage device of the key generating satellite, in some embodiments, may be received by the key generating satellite from one or more other satellites without routing any information through any terrestrial networks or ground infrastructure.

The process 1400 may generate (at block 1415) first and second encryption keys by the key generating satellite using only hardware and software onboard the key generating satellite. For example, the key generating satellite may generate the encryption keys 323 and 324 as described above with reference to FIGS. 3B, 3D, 6C, 6G, 9B, 9D, 12B, and 12D.

The process 1400 may send (at block 1420) the first encryption key from the key generating satellite, through the first communication satellite, to the first communication device. For example, the key generating satellite may send the encryption key 323 to the first communication device 311 as described above with reference to FIGS. 3B, 3D, 6C, 6G, 9B, 9D, 12B, and 12D.

The process 1400 may send (at block 1425) the second encryption key from the key generating satellite, through a second communication satellite, to the second communication device. For example, the key generating satellite may send the encryption key 324 to the second communication device 312 as described above with reference to FIGS. 3B, 3D, 6C, 6G, 9B, 9D, 12B, and 12D.

The first and second communication satellites may be the same communication satellite (e.g., when both the first and second communication devices are covered by the same communication satellite). The first and second communication satellites may be different communication satellites of a constellation of communication satellites (e.g., when the first and second communication devices are not covered by the same communication satellite).

The key generating satellite, in some embodiments, may be at an altitude that is less than the altitude of the first and second communication satellites. In other embodiments, the key generating satellite may be at the same altitude as the first and second communication satellites.

The first and second communication satellites, in some embodiments, may be GEO satellites orbiting around Earth at an altitude of 35,786 km above sea level. In these embodiments, the key generating satellite may be in a constellation of key generating satellites that includes the key generating satellites and several backup, or standby, key generating satellites. The constellation of key generating satellites may be orbing around Earth at an altitude that is less than the altitude of the first and second communication satellites. In these embodiments, the process 1400 may send the connection request from the first communication satellite through one or more backup key generating satellites without routing through any terrestrial networks.

The first and second communication satellites, in some embodiments, may be MEO satellites orbiting around Earth at an altitude of over 2,000 km above sea level and below 35,786 km above sea level. In these embodiments, the key generating satellite may be in a constellation of key generating satellites that includes the key generating satellites and several backup, or standby, key generating satellites. The constellation of key generating satellites may orbit around Earth at an altitude that is less than the altitude of the first and second communication satellites. In these embodiments, sending the connection request from the first communication satellite to the key generating satellite comprises sending the connection request from the first communication satellite through one or more backup key generating satellites without routing through any terrestrial networks.

The process 1400, in some embodiments, may send the second encryption key from the key generating satellite to the second communication device after validating the first communication device by the key generating satellite. In other embodiments, the second communication device may validate the first communication device. For example, the process 1400 may send the connection request from the key generating satellite, through the second communication satellite, to the second communication device. The second communication device may validate the first communication device when the identifications associated with the user of the first communication device match one or more credentials stored in a storage device of the second communication device. The second communication device may then accept the connection request after validating the first communication device.

The process 1400 may encrypt (at block 1430) signals by the first communication device using the first encryption key. For example, the first communication device 311 may encrypt signals using the encryption key 323 as described above with reference to FIGS. 3B, 3D, 6D, 6H, 9B, 9D, 12B, and 12D.

The process 1400 may encrypt (at block 1435) signals by the second communication device using the second encryption key. For example, the second communication device 312 may encrypt signals using the encryption key 324 as described above with reference to FIGS. 3B, 3D, 6D, 6H, 9B, 9D, 12B, and 12D.

The process 1400 may exchange (at block 1440) the encrypted signals by the first and second communication devices through the first and second communication satellites. For example, the first and second communication devices 311-312 may exchange encrypted signals as described above with reference to FIGS. 3B, 3D, 6D, 6H, 9B, 9D, 12B, and 12D. The process 1400 may then end. The encrypted signals exchanged between the first and second communication devices may include voice and data.

In some embodiments, exchanging the encrypted signals by the first and second communication devices may include sending an end of session signal by either one of the first and second communication devices to the key generating satellite through either the first or second communication satellites. In response to receiving the end of session signal, the key generating satellite may drop the encryption keys.

In some embodiments, the process 1400 may change the first and second encryption keys by the key generating satellite while the first and second communication devices are exchanging encrypted signals. The process 1400 may send the changed first encryption key from the key generating satellite, through the first communication satellite, to the first communication device. The process 1400 may send the changed second encryption key from the key generating satellite, through a second communication satellite, to the second communication device. The first communication device may encrypt signals by using the changed first encryption key, and the second communication device may encrypt signals using the changed second encryption key.

In some embodiments, the key generating satellite may be configured to change the first and second encryption keys after a threshold time period. In some embodiments, changing the first and second encryption keys includes receiving a request by the key generating satellite from the second communication device to change the first and second encryption keys. In some embodiments, the connection request may include an instruction for the key generating satellite to change the first and second encryption keys after a threshold time period. In some embodiments, each of the first and second encryption keys may include several encryption keys for use at different time slots during the communication between the first and second communication devices.

The process 1400, in some embodiments, may provide a satellite access number by the key generating satellite to the first and second communication devices for use during the communication between the first and second communication devices. The process 1400, in some embodiments, may change the satellite access number by the key generating satellite while the first and second communication devices are exchanging encrypted signals. The process 1400 may provide the changed satellite access number by the key generating satellite to the first and second communication devices for use during the reminder of the communication between the first and second communication devices.

What is claimed is:

1. A method of communication between first and second communication devices, the method comprising:
   at a first communication satellite, receiving a connection request from a first communication device to connect to a second communication device, the connection request comprising an identification of a key generating satellite;
   sending the connection request from the first communication satellite to the key generating satellite identified by the connection request;
   generating first and second encryption keys by the key generating satellite using only hardware and software onboard the key generating satellite, wherein the key generating satellite does not comprise a transponder that is configured to communicate with ground based infrastructure;
   sending the first encryption key from the key generating satellite, through the first communication satellite, to the first communication device;
   sending the second encryption key from the key generating satellite, through a second communication satellite, to the second communication device;
   encrypting signals by the first communication device using the first encryption key;
   encrypting signals by the second communication device using the second encryption key; and
   exchanging the encrypted signals by the first and second communication devices through the first and second communication satellites,
   wherein the communication between the first and second communication devices does not route through any terrestrial networks.

2. The method of claim 1, wherein the connection request further comprises one or more identifications associated with a user of the first communication device, the method further comprising:
   determining that the one or more identifications associated with the user of the first communication device match one or more credentials stored in a storage device of the key generating satellite; and
   validating the first communication device based on the determination.

3. The method of claim 2, wherein sending the second encryption key from the key generating satellite to the second communication device comprises sending the second encryption key after validating the first communication device.

4. The method of claim 2, wherein the one or more credentials stored in the storage device of the key generating satellite are received by the key generating satellite from one or more other satellites without routing through any terrestrial networks.

5. The method of claim 2, wherein the one or more identifications associated with the user of the first communication device comprise one or more of a username, a password, a telephone number, or a set of biometric information.

6. The method of claim 1, wherein the connection request further comprises one or more identifications associated with a user of the first communication device, the method further comprising:
   sending the connection request from the key generating satellite, through the second communication satellite, to the second communication device;
   determining that the one or more identifications associated with the user of the first communication device match one or more credentials stored in a storage device of the second communication device;
   validating the first communication device based on the determination; and
   accepting the connection request, by the second communication device, after validating the first communication device.

7. The method of claim 1 further comprising:
   changing the first and second encryption keys by the key generating satellite while the first and second communication devices are exchanging the encrypted signals;
   sending the changed first encryption key from the key generating satellite, through the first communication satellite, to the first communication device;
   sending the changed second encryption key from the key generating satellite, through a second communication satellite, to the second communication device;
   encrypting signals by the first communication device using the changed first encryption key; and
   encrypting signals by the second communication device using the changed second encryption key.

8. The method of claim 7, wherein the key generating satellite is configured to change the first and second encryption keys after a threshold time period.

9. The method of claim 7, wherein changing the first and second encryption keys comprises receiving a request by the key generating satellite from the second communication device to change the first and second encryption keys.

10. The method of claim 7, wherein the connection request comprises an instruction for the key generating satellite to change the first and second encryption keys after a threshold time period.

11. The method of claim 1, wherein each of the first and second encryption keys comprises a plurality of encryption keys for use at different time slots during the communication between the first and second communication devices.

12. The method of claim 1 further comprising:
providing a satellite access number by the key generating satellite to the first and second communication devices for use during the communication between the first and second communication devices;
changing the satellite access number by the key generating satellite while the first and second communication devices are exchanging encrypted signals; and
providing the changed satellite access number by the key generating satellite to the first and second communication devices for use during a reminder of the communication between the first and second communication devices.

13. The method of claim 1, wherein the key generating satellite is at an altitude that is less than an altitude of the first and second communication satellites.

14. The method of claim 1, wherein the key generating satellite is at a same altitude as the first and second communication satellites.

15. The method of claim 1, wherein the first and second communication satellites are geostationary equatorial orbit (GEO) satellites orbiting around the Earth at an altitude of 35,786 km above sea level,
wherein the key generating satellite is in a constellation of key generating satellites comprising the key generating satellites and a plurality of backup key generating satellites,
wherein the constellation of key generating satellites orbing orbiting around the Earth at an altitude that is less than the altitude of the first and second communication satellites, and
wherein sending the connection request from the first communication satellite to the key generating satellite comprises sending the connection request from the first communication satellite through one or more backup key generating satellites without routing through any terrestrial networks.

16. The method of claim 1, wherein the first and second communication satellites are medium Earth orbit (MEO) satellites orbiting around the Earth at an altitude of over 2,000 km above sea level and below 35,786 km above sea level,
wherein the key generating satellite is in a constellation of key generating satellites comprising the key generating satellites and a plurality of backup key generating satellites,
wherein the constellation of key generating satellites orbing orbiting around the Earth at an altitude that is less than the altitude of the first and second communication satellites, and
wherein sending the connection request from the first communication satellite to the key generating satellite comprises sending the connection request from the first communication satellite through one or more backup key generating satellites without routing through any terrestrial networks.

17. The method of claim 1:
wherein the first communication device comprises a first hardware encryption unit, wherein the second communication device comprises a second hardware encryption unit, and wherein the key generating satellite comprises a third hardware encryption unit,
wherein each of the first, second, and third hardware encryption units is configured to decrypt signals encrypted by the others of the first, second, and third hardware encryption units,
wherein sending the connection request from the first communication satellite to the key generating satellite comprises:
encrypting at least a portion of the connection request by the first communication device using the first hardware encryption unit; and
decrypting the encrypted portion of the connection request by the key generating satellite using the third hardware encryption unit.

18. The method of claim 1, wherein exchanging the encrypted signals by the first and second communication devices comprises:
sending an end of session signal by one of the first or second communication devices to the key generating satellite through one of the first or second communication satellites, and
in response to receiving the end of session signal, dropping the encryption keys by the key generating satellite.

19. The method of claim 1, the encrypted signals exchanged between the first and second communication devices comprise voice and data.

20. The method of claim 1, wherein the first and second communication satellites are a same communication satellite.

21. The method of claim 1, wherein the first and second communication satellites are different communication satellites of a constellation of communication satellites.

* * * * *